(12) United States Patent
Osaka et al.

(10) Patent No.: US 9,815,202 B2
(45) Date of Patent: Nov. 14, 2017

(54) CONTROL METHOD FOR ROBOT APPARATUS, COMPUTER READABLE RECORDING MEDIUM, AND ROBOT APPARATUS

(71) Applicant: CANON KABUSHIKI KAISHA, Tokyo (JP)

(72) Inventors: Tsutomu Osaka, Yokohama (JP);
Takahiro Ishikawa, Kawasaki (JP);
Shunsuke Kawamura, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/792,987

(22) Filed: Jul. 7, 2015

(65) Prior Publication Data
US 2016/0008983 A1 Jan. 14, 2016

(30) Foreign Application Priority Data

Jul. 9, 2014 (JP) ................................. 2014-141634

(51) Int. Cl.
*G06F 19/00* (2011.01)
*B25J 9/16* (2006.01)
*B25J 9/06* (2006.01)
*G05B 19/404* (2006.01)

(52) U.S. Cl.
CPC ............... *B25J 9/1692* (2013.01); *B25J 9/06* (2013.01); *B25J 9/1602* (2013.01); *B25J 9/1628* (2013.01);

(Continued)

(58) Field of Classification Search
CPC ......... B25J 9/00; B25J 9/02; B25J 9/04; B25J 9/06; B25J 9/10; B25J 9/16; B25J 13/06;
(Continued)

(56) References Cited

U.S. PATENT DOCUMENTS 5,214,749 A * 5/1993 Brown ................... B25J 9/1643
700/260
6,275,748 B1 * 8/2001 Bacchi .............. H01L 21/68707
414/941

(Continued)

FOREIGN PATENT DOCUMENTS

EP 1591857 A2 11/2005
EP 2361736 A2 8/2011
(Continued)

*Primary Examiner* — Muhammad Shafi
(74) *Attorney, Agent, or Firm* — Canon U.S.A., Inc. IP Division

(57) ABSTRACT

Semi-closed control or fully closed control is selected as a control system for a joint using a motor configured to drive a joint of a robot arm via a reduction gear, an input-side encoder, and an output-side encoder, the semi-closed control being control in which an output of the input-side encoder is used, the fully closed control being control in which an output of the output-side encoder is used. A test run is performed plural times in which the robot arm is caused to perform a specific operation while semi-closed control is being performed on the joint, and semi-closed control or fully closed control is selected using outputs of the output-side encoder obtained in the test runs or in accordance with the content of a task that the robot arm is to be caused to perform.

19 Claims, 13 Drawing Sheets

(52) U.S. Cl.
CPC .. *G05B 19/404* (2013.01); *G05B 2219/14016* (2013.01); *G05B 2219/14126* (2013.01); *G05B 2219/37325* (2013.01); *G05B 2219/39206* (2013.01); *G05B 2219/42318* (2013.01); *G05B 2219/45071* (2013.01); *Y10S 901/02* (2013.01); *Y10S 901/09* (2013.01)

(58) Field of Classification Search
CPC ... B25J 13/08; B25J 15/02; B25J 15/08; B25J 17/00; B25J 18/00; B25J 19/02; B25J 9/14; B25J 9/12; B25J 9/1692; B25J 9/1628
USPC ............... 701/12, 44, 57.68, 31.3, 411, 436, 701/445–448, 481, 480; 318/568.11, 318/568.12, 568.2; 700/263, 245, 248, 700/261, 900
See application file for complete search history.

(56) References Cited

U.S. PATENT DOCUMENTS

| | | | |
|---|---|---|---|
| 7,181,294 B2* | 2/2007 | Nihei | G05D 19/02 318/561 |
| 2005/0228513 A1* | 10/2005 | Nihei | G05D 19/02 700/52 |
| 2014/0084839 A1* | 3/2014 | Matsumura | H02P 5/46 318/570 |
| 2014/0084840 A1 | 3/2014 | Osaka | |

FOREIGN PATENT DOCUMENTS

| | | |
|---|---|---|
| EP | 2492057 A1 | 8/2012 |
| JP | S62-184504 A | 8/1987 |
| JP | 2011-176913 A | 9/2011 |

* cited by examiner

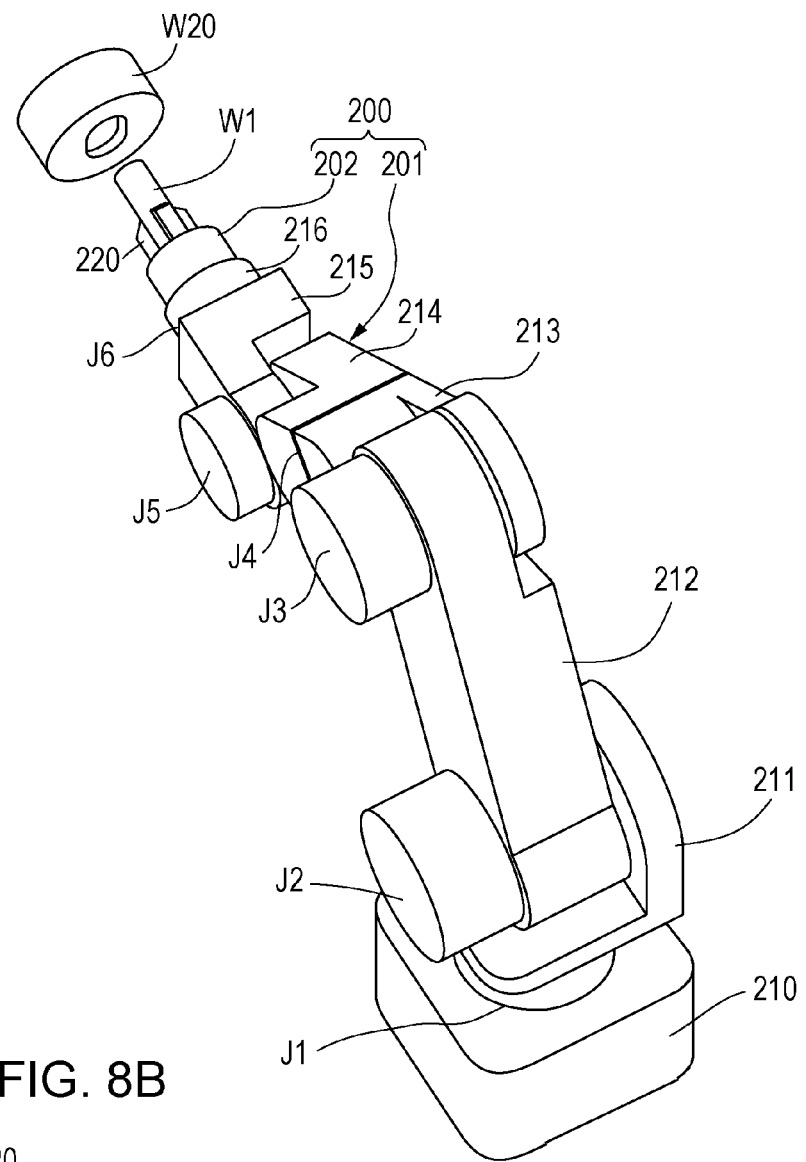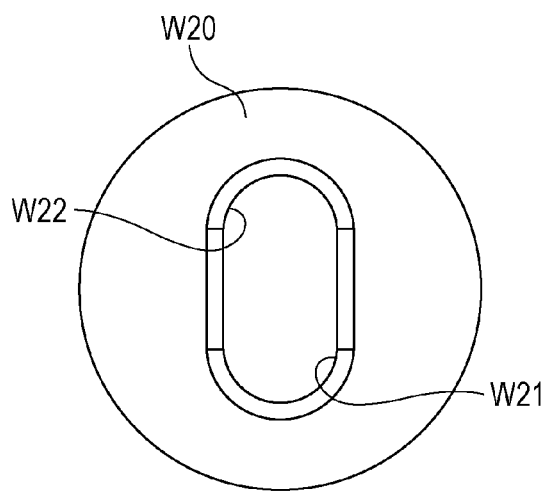

CONTROL METHOD FOR ROBOT APPARATUS, COMPUTER READABLE RECORDING MEDIUM, AND ROBOT APPARATUS

BACKGROUND OF THE INVENTION

Field of the Invention

The present invention relates to a control method for a robot apparatus, a computer readable recording medium, and a robot apparatus.

Description of the Related Art

Robots having multi-joint robot arms and end effectors provided at the tips of the robot arms are used in manufacturing lines, where products are manufactured. A joint mechanism of such a robot arm includes a servomotor, such as an AC servomotor or a DC brushless servomotor, and a reduction gear located on the output side of the servomotor so as to obtain a high torque output. The joint mechanism is connected to a structural member or element, such as a link. An angle is detected by a rotary encoder directly connected to the rotating shaft of a motor provided on the input side of the reduction gear (hereinafter referred to as an "encoder"). The position of the tip of the robot arm (the tip of a hand of the robot) is controlled in accordance with a detection result. Since the encoder provided on the input side of this reduction gear does not detect distortion or looseness of the reduction gear, a position error of the tip of the robot arm may occur. In addition, a position error may also occur at the tip of the robot arm when the posture of the robot arm or the mass of a work piece changes. A timing belt or a strain wave gear is often used in a drive system. Distortion or looseness occurs in this type of drive system, which is a cause of a position error of the tip of the robot arm.

In addition, a configuration is known that may reduce position error of the tip of the robot arm. In the configuration, an encoder is provided at an output shaft of the reduction gear. In addition, a robot has been proposed which is equipped with encoders at both an input shaft and an output shaft of a reduction gear and has a high-accuracy mode which uses encoder information of the output shaft and a high-speed mode which does not use encoder information of the output shaft (for example, see Japanese Patent Laid-Open No. 2011-176913). In a numerically controlled apparatus that performs finishing and roughing, fully closed control is performed during finishing and semi-closed control is performed during roughing. In this manner, a configuration has been proposed with which control is switched between semi-closed control and fully closed control in accordance with a desired accuracy (for example, see Japanese Patent Application Laid-Open No. 62-184504).

In this specification, the high-accuracy mode in Japanese Patent Laid-Open No. 2011-176913 is technically regarded as the same as the fully closed control in Japanese Patent Laid-Open No. 62-184504 and the high-accuracy mode is also referred to as fully closed control. In addition, the high-speed mode in Japanese Patent Laid-Open No. 2011-176913 is technically regarded as the same as the semi-closed control in Japanese Patent Laid-Open No. 62-184504 and the high-speed mode is also referred to as semi-closed control.

To perform the fully closed control illustrated in Japanese Patent Laid-Open Nos. 2011-176913, 62-184504, and the like, a mechanism of a reduction gear and the like is included in a control loop and a servo system tends to oscillate because of the mechanism. Thus, a low servo gain needs to be achieved and, as a result, an operation speed tends to be reduced. In contrast, to perform the semi-closed control, the size of a mechanism including a reduction gear and the like is smaller than that for performing the fully closed control in a control loop and the servo system oscillates to a smaller degree. Thus, a high servo gain may be achieved and a high-speed operation is often possible. As described above, in general, when the same mechanism is controlled, fully closed control is often better than semi-closed control in terms of accuracy and semi-closed control is better than fully closed control in terms of operation speed.

In addition, in the case where a task is performed by a robot arm, a plurality of process operations are necessary. In the range that satisfies a user's desired accuracy, if semi-closed control is performed for as many process operations as possible, it is highly likely that an operation time of the robot arm may be reduced. In addition, the robot arm is constituted by a plurality of joints. In the range that satisfies the user's desired accuracy, if semi-closed control is performed on as many joints as possible, it is highly likely that an operation time of the robot arm may be reduced.

The present invention reduces an operation time of a robot apparatus by increasing a percentage of semi-closed control through determination of process operations or joints that need fully closed control in the range that satisfies a user's desired accuracy and through performance of fully closed control only in necessary cases.

SUMMARY OF THE INVENTION

The present invention provides a control method for a robot apparatus, the robot apparatus including a robot arm having an end effector located at an end of the robot arm, the robot arm including a plurality of links coupled one to another by one or more joints, and a control device configured to selectively perform semi-closed control or fully closed control on the joint, the joint including a motor configured to drive the joint via a reduction gear, an input-side encoder configured to detect an angle of an input drive shaft of the reduction gear, and an output-side encoder configured to detect an angle of an output drive shaft of the reduction gear, the semi-closed control being control in which an angle of the joint is controlled in accordance with an output of the input-side encoder, the fully closed control being control in which an angle of the joint is controlled in accordance with an output of the output-side encoder. The control method includes performing a test run a plurality of times in which the control device causes the robot arm to operate while performing semi-closed control on the joint, selecting in which cases the control device selects either the semi-closed control or the fully closed control for use to control the joint in accordance with an evaluation result, which is obtained by the control device evaluating the tip position of the robot arm at a specific point using outputs of the output-side encoder obtained in the test runs, and causing the robot arm to perform semi-closed control or fully closed control on the joint, as selected in the selecting step.

The present invention provides a control method for a robot apparatus, the robot apparatus including a robot arm having an end effector located at an end of the robot arm, the robot arm including a plurality of links coupled one to another by one or more joints, and a control device configured to selectively perform semi-closed control or fully closed control on the joint, the joint including a motor configured to drive the joint via a reduction gear, an input-side encoder configured to detect an angle of an input drive shaft of the reduction gear, and an output-side encoder configured to detect an angle of an output drive shaft of the reduction gear, the semi-closed control being control in which an angle of the joint is controlled in accordance with an output of the input-side encoder, the fully closed control being control in which an angle of the joint is controlled in accordance with an output of the output-side encoder. The control method includes determining the content of a task that the robot arm is to be caused to perform, selecting either the semi-closed control or the fully closed control for use to control the joint in accordance with the content of the task that is determined in the determining step and that the robot arm is to be caused to perform, and performing a certain operation using the semi-closed control or the fully closed control on the joint, which is selected in the selecting step.

The present invention provides a robot apparatus including a robot arm having an end effector located at an end of the robot arm, the robot arm including a plurality of links coupled one to another by one or more joints, and a control device configured to selectively perform semi-closed control or fully closed control on the joint, the joint including a motor configured to drive the joint via a reduction gear, an input-side encoder configured to detect an angle of an input drive shaft of the reduction gear, and an output-side encoder configured to detect an angle of an output drive shaft of the reduction gear, the semi-closed control being control in which an angle of the joint is controlled in accordance with an output of the input-side encoder, the fully closed control being control in which an angle of the joint is controlled in accordance with an output of the output-side encoder. The control device is configured to perform a test run a plurality of times in which the control device causes the robot arm to operate while performing semi-closed control on the joint, evaluates the tip position of the robot arm at a specific point using outputs of the output-side encoder obtained in the test runs, selects either the semi-closed control or the fully closed control for use to control the joint in accordance with an evaluation result, and causes the robot arm to operate while performing the selected semi-closed control or fully closed control on the joint.

The present invention provides a robot apparatus including a robot arm having an end effector located at an end of the robot arm, the robot arm including a plurality of links coupled one to another by one or more joints, and a control device configured to selectively perform semi-closed control or fully closed control on the joint, the joint including a motor configured to drive the joint via a reduction gear, an input-side encoder configured to detect an angle of an input drive shaft of the reduction gear, and an output-side encoder configured to detect an angle of an output drive shaft of the reduction gear, the semi-closed control being control in which an angle of the joint is controlled in accordance with an output of the input-side encoder, the fully closed control being control in which an angle of the joint is controlled in accordance with an output of the output-side encoder. The control device is configured to select either the semi-closed control or the fully closed control of the joint in accordance with a content of a task that the robot arm is to perform, and to cause the robot arm to operate while performing the selected semi-closed control or fully closed control on the joint.

Further features of the present invention will become apparent from the following description of exemplary embodiments with reference to the attached drawings.

With the above-described configuration, the tip position of the robot arm is evaluated at specific points during test runs, semi-closed control or fully closed control is selected in accordance with the evaluation result. Alternatively, semi-closed control or fully closed control is selected in accordance with the content of an operation that has been determined and that the robot arm is to be caused to perform. Thus, it is highly likely that, for example, a minimal amount of fully closed control may be selected such that the user's desired accuracy is satisfied and the percentage of semi-closed control may be increased. As a result, an advantageous effect may be obtained in that a reduction in the operation speed of the robot apparatus may be made smaller and the work efficiency of a robot may be significantly improved.

BRIEF DESCRIPTION OF THE DRAWINGS

FIG. 8A is an illustrative diagram illustrating an operation for inserting a first work piece into a second work piece, and FIG. 8B is a front view illustrating the configuration of the second work piece in a robot apparatus according to a third exemplary embodiment.

DESCRIPTION OF THE EMBODIMENTS

In the following, embodiments of the present invention will be described with reference to the drawings. Each of the embodiments of the present invention described below can be implemented solely or as a combination of a plurality of the embodiments or features thereof where necessary or where the combination of elements or features from individual embodiments in a single embodiment is beneficial.

First Exemplary Embodiment

In a first exemplary embodiment, a configuration will be described with which fully closed control is performed only for necessary processes among a plurality of processes included in a task of a robot arm.

(1) Description of Terms

Here, the meaning of terms used in this specification is described, the terms being a target value, accuracy, a user's desired accuracy, a bias, and variation. When a robot arm is used, a request is made that the tip position of the robot arm is moved to or stopped at a desired target position (also referred to as a position point). In addition, for joints of the robot arm, a request is made that the angle of each joint (a joint angle) is controlled so as to become equal to a desired target angle. A value regarding this target position or a target posture, such as a coordinate value or an angle value, is referred to as a "target value". This "target value" becomes an issue mainly for a path of the tip position of the robot arm, a stopping position (a position point or a teaching point), a joint angle, or the like. In an actual operation of a robot apparatus, for example, even when a certain operation defined by a robot program is executed a few times, the distribution of the tip position of a robot arm is such that actual positions indicated by the tip position of the robot arm are located within a certain range. This distribution is referred to as "accuracy". In particular, a "distribution" (accuracy) needed by a user is referred to as the user's desired accuracy. In addition, in the "accuracy", the difference between a target value and a distribution average is referred to as a "bias" and the width of the distribution is referred to as "variation". This "bias" may also be referred to as "the degree of precision" or the like. In addition, the "variation" is evaluated in accordance with a value obtained by multiplying, for example, a standard deviation severalfold or a value, such as the difference between the maximum value and the minimum value of the amount of distortion. Note that a statistical or mathematical method especially for evaluation of the "variation" regarding accuracy is known, and thus a description of the details of such a statistical or mathematical method will be omitted in the following.

(2) Description of Configuration of Robot Apparatus

Figure 1:
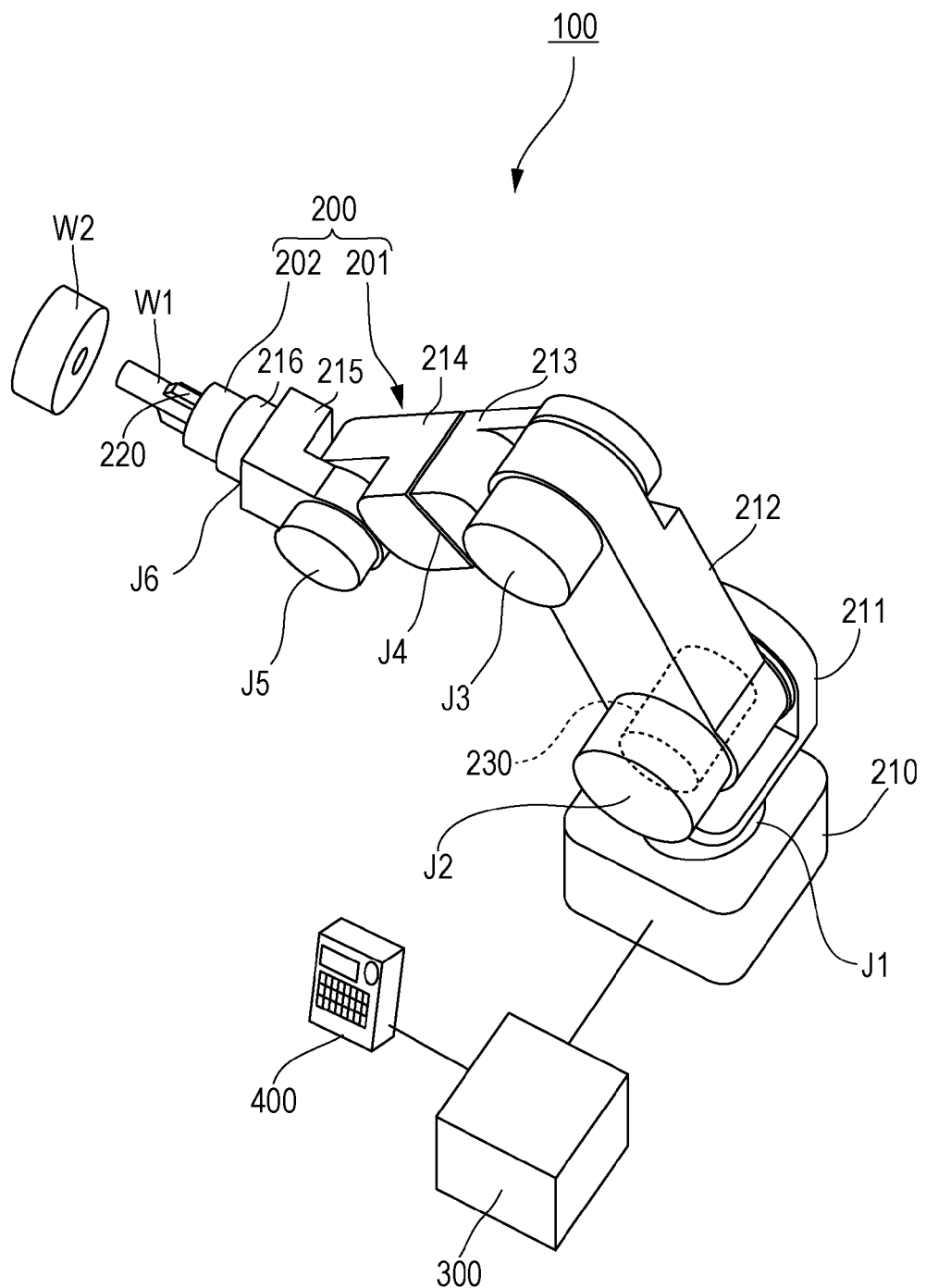
FIG. 1 is a perspective view illustrating a robot apparatus according to a first exemplary embodiment.

FIG. 1 is a perspective view illustrating a robot apparatus according to the first exemplary embodiment of the present invention. A robot apparatus 100 includes a robot 200, a control device 300, and a teaching pendant 400. The control device 300 serves as a controller that controls an operation of the robot 200. The teaching pendant 400 serves as a teaching unit that teaches an operation of the robot 200 through operation by a user.

The robot 200 includes a robot arm 201 and a robot hand 202. The robot arm 201 is a multi-axis articulated robot arm. The robot hand 202 serves as an end effector attached to the tip of the robot arm 201.

In the robot arm 201, a base unit 210 to be fixed to a workbench and a plurality of links 211 to 216 through which a deviation or power is transferred are connected at joints J1 to J6 such that flection or rotation is possible. In the first exemplary embodiment, the robot arm 201 includes the joints J1 to J6 for six axes, three for flection and three for rotation. Here, flection refers to bending at a certain point of a portion where two links are coupled. Rotation refers to rotation of one of two links relative to the other link around the rotating shaft extending in the longitudinal direction of the two links. A joint for performing flection is called a flection unit and a joint for performing rotation is called a rotation unit. The robot arm 201 includes six joints, which are the joints J1 to J6. The joints J1, J4, and J6 are rotation units and the joints J2, J3, and J5 are flection units.

The robot hand 202 is coupled to a sixth link (a tip link) 216, is an end effector for assembling a work piece W1 serving as a first work piece, and has a plurality of fingers 220. The work piece W1 may be held by causing the plurality of fingers 220 to perform a close operation, and the work piece W1 may be released by causing the plurality of fingers 220 to perform an opening operation.

The robot arm 201 includes a plurality of (six) joint driving units 230 that are provided for and drive the respective joints J1 to J6. Note that, in FIG. 1, such a joint driving unit 230 is illustrated only for the joint J2 for the sake of convenience and such joint driving units 230 are not illustrated for the other joints J1 and J3 to J6. However, joint driving units 230 similar to that for the joint J2 are also arranged for the other joints J1 and J3 to J6. In addition, the first exemplary embodiment describes the case where all the joints J1 to J6 include the joint driving units 230; however, at least one of the joints J1 to J6 should be driven by such a joint driving unit 230.

In the following, the joint driving unit 230 at the joint J2 will be described as a representative example and a description for the joint driving units 230 for the other joints J1 and J3 to J6 will be omitted since the joint driving units 230 may be different in size or performance but have configurations similar to that for the joint J2.

(3) Description of Configuration of Joint Driving Unit 230 at Joint J2

Figure 2A:
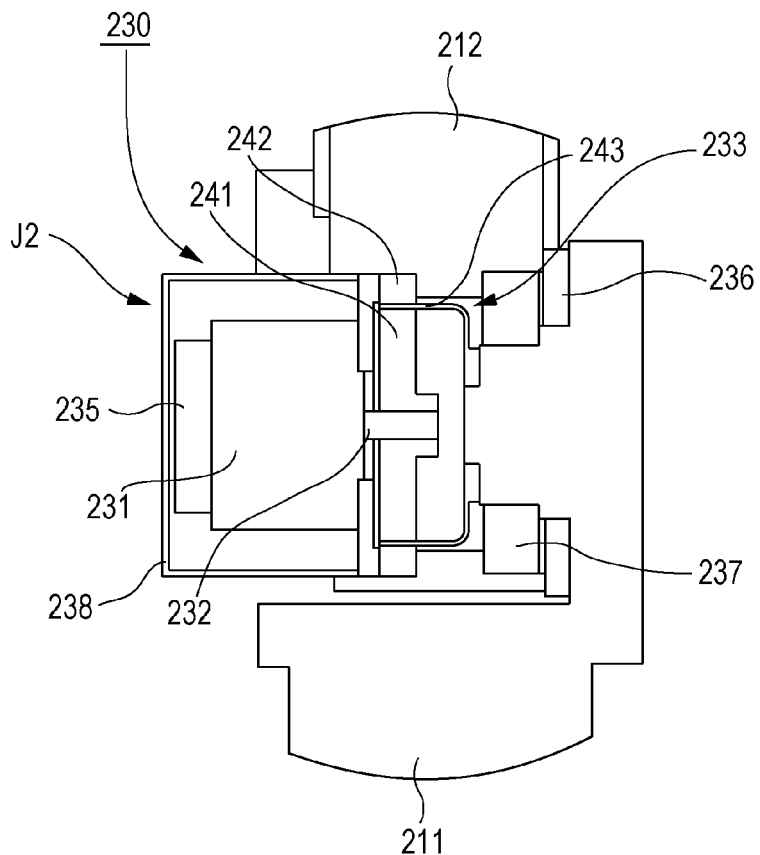
FIGS. 2A and 2B are diagrams illustrating a drive system of a joint of a robot arm, FIG. 2A being a partial cross section of the joint, FIG. 2B being a block diagram of a control system of the joint.

FIG. 2A is a partial cross section illustrating the joint J2 of the robot arm 201. The joint driving unit 230 includes a rotary motor (hereinafter referred to as a "motor") 231, which is an electromagnetic motor, and a reduction gear 233, which slows down rotation of a rotating shaft 232 of the motor 231.

In addition, the joint driving unit 230 includes an input-side encoder 235 as an input-side angle detection unit. The input-side encoder 235 detects an angle of an input drive shaft of the reduction gear 233. In the first exemplary embodiment, the input-side encoder 235 detects an angle of either one of the rotating shaft 232 of the motor 231 and the input shaft of the reduction gear 233 and a rotation angle of the rotating shaft 232 of the motor 231.

In addition, the joint driving unit 230 includes an output side encoder 236 as an output-side angle detection unit. The output-side encoder 236 detects an angle of an output drive shaft of the reduction gear 233. In the first exemplary embodiment, the output-side encoder 236 detects a rotation angle of the output shaft of the reduction gear 233. Note that, although not illustrated in FIG. 2A, the joint driving unit 230 includes a motor drive device, which will be described later. The motor 231 may include, for example, a servomotor, especially a brushless DC servomotor or an AC servomotor.

The input-side encoder 235 is desirably an absolute rotary encoder and includes an absolute single-turn rotary encoder, a counter that counts the total number of times of rotation of the absolute single-turn rotary encoder, and a backup battery for supplying power to the counter. If this backup battery is available in the case where the power supply to the robot arm 201 is off, the total number of times of rotation is held by the counter regardless of whether the power supply to the robot arm 201 is on or off. Such a configuration makes it possible to control the posture of the robot arm 201 over a time period including, for example, a no-power-supply period. Note that the input-side encoder 235 is attached to the rotating shaft 232 but may also be attached to the input shaft of the reduction gear 233.

The output-side encoder 236 is a rotary encoder that detects a relative angle between the base unit 210 and the link 211 or a relative angle between two adjacent links. At the joint J2, the output-side encoder 236 is a rotary encoder that detects a relative angle between the link 211 and the link 212. The output-side encoder 236 has a configuration in which an encoder scale is provided at the link 211 and a detection head is provided at the link 212 (alternatively, a configuration having a detection head at the link 211 and an encoder scale at the link 212). The link 211 is coupled to the link 212 via a cross roller bearing 237 in a rotatable manner.

The motor 231 is covered and protected by a motor cover 238. A brake unit, not illustrated, is provided between the motor 231 and the input-side encoder 235. A main function of this brake unit is to hold the posture of the robot arm 201 while the power is off.

In the first exemplary embodiment, the reduction gear 233 includes, for example, a small, light strain wave gear having a high reduction ratio. The reduction gear 233 includes a wave generator 241 as an input shaft and a circular spline 242 as an output shaft. The wave generator 241 is coupled to the rotating shaft 232 of the motor 231 and the circular spline 242 is fixed to the link 212. Note that the circular spline 242 is directly connected to the link 212; however, the circular spline 242 may also be integrally formed with the link 212.

In addition, the reduction gear 233 includes a flex spline 243, which is arranged between the wave generator 241 and the circular spline 242 and fixed to the link 211. The flex spline 243 is slowed down at a reduction ratio of N relative to the wave generator 241 in terms of rotation and rotates relative to the circular spline 242. Thus, rotation of the rotating shaft 232 of the motor 231 is slowed down at a reduction ratio of 1/N by the reduction gear 233, the link 212 to which the circular spline 242 is fixed is rotated relative to the link 211 to which the flex spline 243 is fixed, and thus the joint J2 is flexed.

In the above-described configuration, the input-side encoder 235 and the output-side encoder 236 are provided. Thus, either semi-closed control or fully closed control may be selected and used. In the semi-closed control, feedback is performed using the input-side angle detection unit. In the fully closed control, feedback is performed using the outputs-side angle detection unit.

Figure 2B:
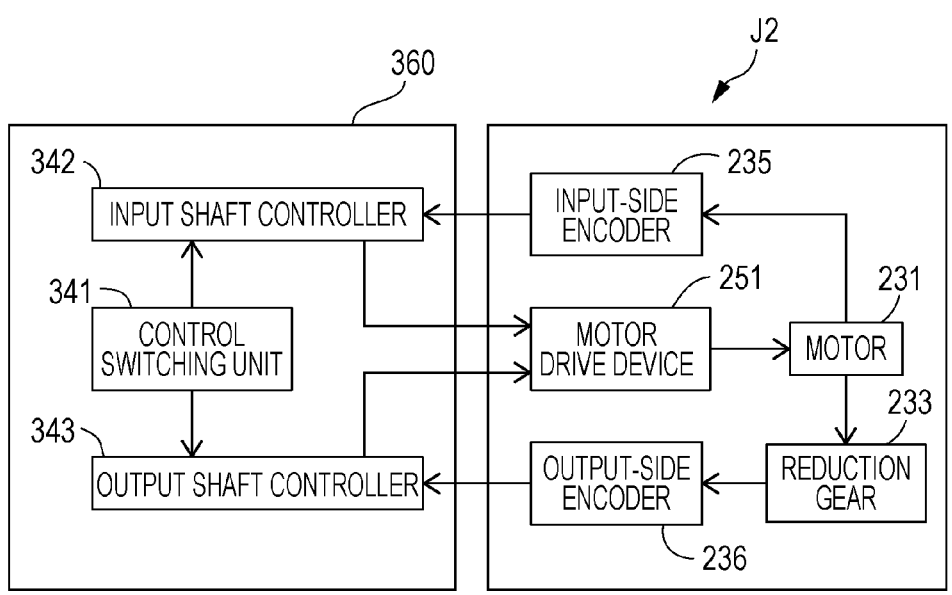

FIG. 2B illustrates the configuration of a joint driving controller 360 (FIG. 4), which controls an operation of the motor 231 of the joint J2 using the input-side encoder 235 and the output-side encoder 236 described above. FIG. 2B is a functional block diagram of a central processing unit (CPU) 301 in accordance with a program 320 of the control device 300 (FIG. 3), which will be described later, and is a block diagram of the joint J2 of the robot arm 201. The control device 300, which will be described later, has functions of the joint driving controller 360 corresponding to the joints. FIG. 2B illustrates only a portion of the joint driving controller 360 related to the joint J2; however, the joint driving controller 360 also has configurations corresponding to the other joints J1 and J3 to J6.

Next, the joint driving controller 360 will be described. A control switching unit 341 performs switching in accordance with an operation mode selected by an operation mode selector 350 (FIG. 4), which will be described later, as to whether an input shaft controller 342 or an output shaft controller 343 is to be activated. Specifically, in the case of reception of a command for switching to input shaft control, the control switching unit 341 activates the input shaft controller 342 (semi-closed control). In the case of reception of a command for switching to output shaft control, the control switching unit 341 activates the output shaft controller 343 (fully closed control).

The input shaft controller 342 controls the joint in accordance with a value of the input-side encoder 235. That is, the input shaft controller 342 performs position control by referring to angle information obtained from the input-side encoder 235. The output shaft controller 343 controls the joint in accordance with a value of the output-side encoder 236. That is, the output shaft controller 343 performs position control by referring to angle information obtained from the output-side encoder 236.

In the case of an output control mode, in which the output shaft controller 343 performs control, since the effect due to the elasticity or looseness of the reduction gear 233 is reduced, the accuracy of the tip position may be ensured. In contrast, in the case of an input control mode, in which the input shaft controller 342 performs control, the accuracy of the tip position is reduced by the elasticity or the like of the reduction gear 233. However, the amount of compliance is larger because of the elasticity of the reduction gear 233 than in the case where the output shaft controller 343 performs control. The degree of compliance (tracking) is large, for example, when parts are inserted.

(4) Description of Configuration of Control Device 300

Figure 3:
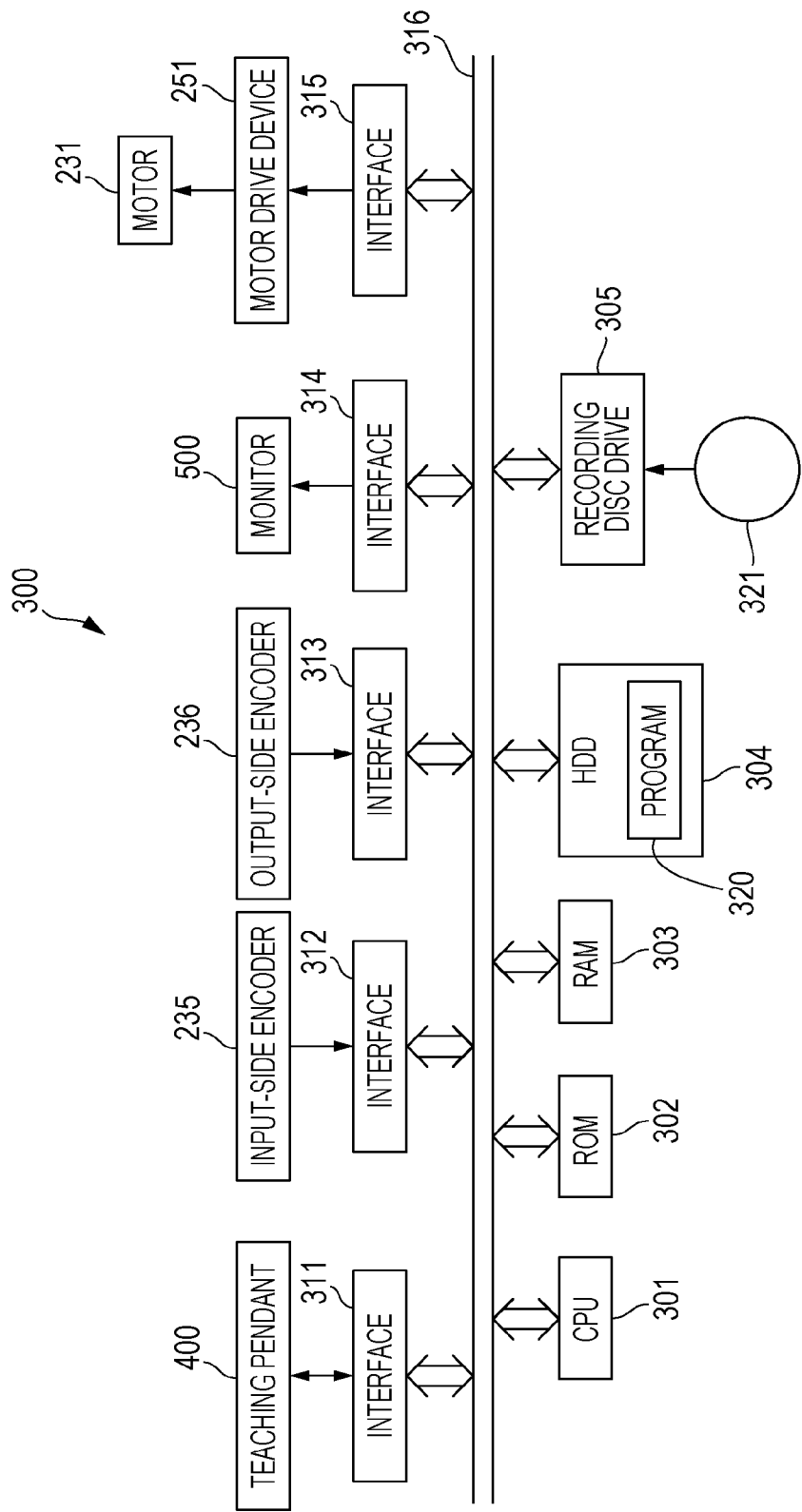
FIG. 3 is a block diagram illustrating the configuration of a control device of the robot apparatus according to the first exemplary embodiment.

FIG. 3 is a block diagram illustrating the configuration of the control device 300 of the robot apparatus 100. The control device 300 includes the CPU 301, which serves as a controller (an arithmetic operation unit). In addition, the control device 300 includes a read-only memory (ROM) 302, a random-access memory (RAM) 303, and a hard disk drive (HDD) 304, which serve as a storage unit.

The ROM 302, the RAM 303, the HDD 304, a recording disc drive 305, and various types of interfaces 311 to 315 are connected to the CPU 301 via a bus 316. The ROM 302 stores basic programs, such as a BIOS and the like. The RAM 303 is a storage device that temporarily stores various types of data, such as results of arithmetic processing performed by the CPU 301 or the like.

The HDD 304 is a storage device that stores results of arithmetic processing performed by the CPU 301, various types of data obtained from the outside, or the like and also stores the program 320, which causes the CPU 301 to execute various types of pieces of arithmetic processing to be described later. The CPU 301 executes processes of a robot control method in accordance with the program 320 recorded (stored) in the HDD 304. The recording disc drive 305 may read various types of data, programs, or the like stored in a recording disc 321.

The teaching pendant 400 serving as a teaching unit is connected to the interface 311. The teaching pendant 400 specifies, in accordance with an operation input by the user, a teaching point for teaching the robot 200, that is, target joint angles (angle command values) of the joints J1 to J6. The data of the teaching point (teaching data) are output to the CPU 301 or the HDD 304 through the interface 311 and the bus 316. The CPU 301 receives teaching data, as an input, from the teaching pendant 400 or the HDD 304.

The input-side encoder 235 is connected to the interface 312, and the output-side encoder 236 is connected to the interface 313. These encoders output pulse signals indicating detected angle detection values. The CPU 301 receives pulse signals, as inputs, from the encoders via the interfaces 312 and 313 and the bus 316.

A display apparatus (a monitor) 500 serving as a display unit is connected to the interface 314 and displays images under control of the CPU 301.

A motor drive device 251 is connected to the interface 315. The CPU 301 outputs, in accordance with the teaching data, data of a driving command specifying a controlled variable of a rotation angle of the rotating shaft 232 of the motor 231 to the motor drive device 251 via the bus 316 and the interface 315 at intervals of a predetermined time.

The motor drive device 251 calculates the amount of a current to be output to the motor 231 in accordance with the driving command received from the CPU 301, supplies the current to the motor 231, and performs joint angle control on the joints J1 to J6. A plurality of motor drive devices 251 such as the motor drive device 251 are provided so as to correspond to the respective joints J1 to J6. For example, although not illustrated in FIG. 2B, the motor drive devices 251 are arranged in the respective joints J1 to J6. Then, the motor 231 produces a driving torque upon receiving power supplied from the motor drive device 251 and torques the wave generator 241, which is the input shaft of the reduction gear 233. In the reduction gear 233, the circular spline 242 serving as the output shaft rotates at a 1/N rotation rate of the wave generator 241. As a result, the link 212 rotates relative to the link 211. That is, the CPU 301 controls, via the motor drive devices 251, motors 231 driving the joints J1 to J6 such that the joint angles of the joints J1 to J6 become target joint angles.

Note that non-illustrated external memory devices, such as a removable flash memory, an external HDD, and the like, may also be connected to the bus 316 via non-illustrated interfaces. These memory devices may be used, for example, for rewriting or updating a control program stored in the ROM 302 or the HDD 304, the control program being described later.

(5) Function of Control Device 300

Figure 4:
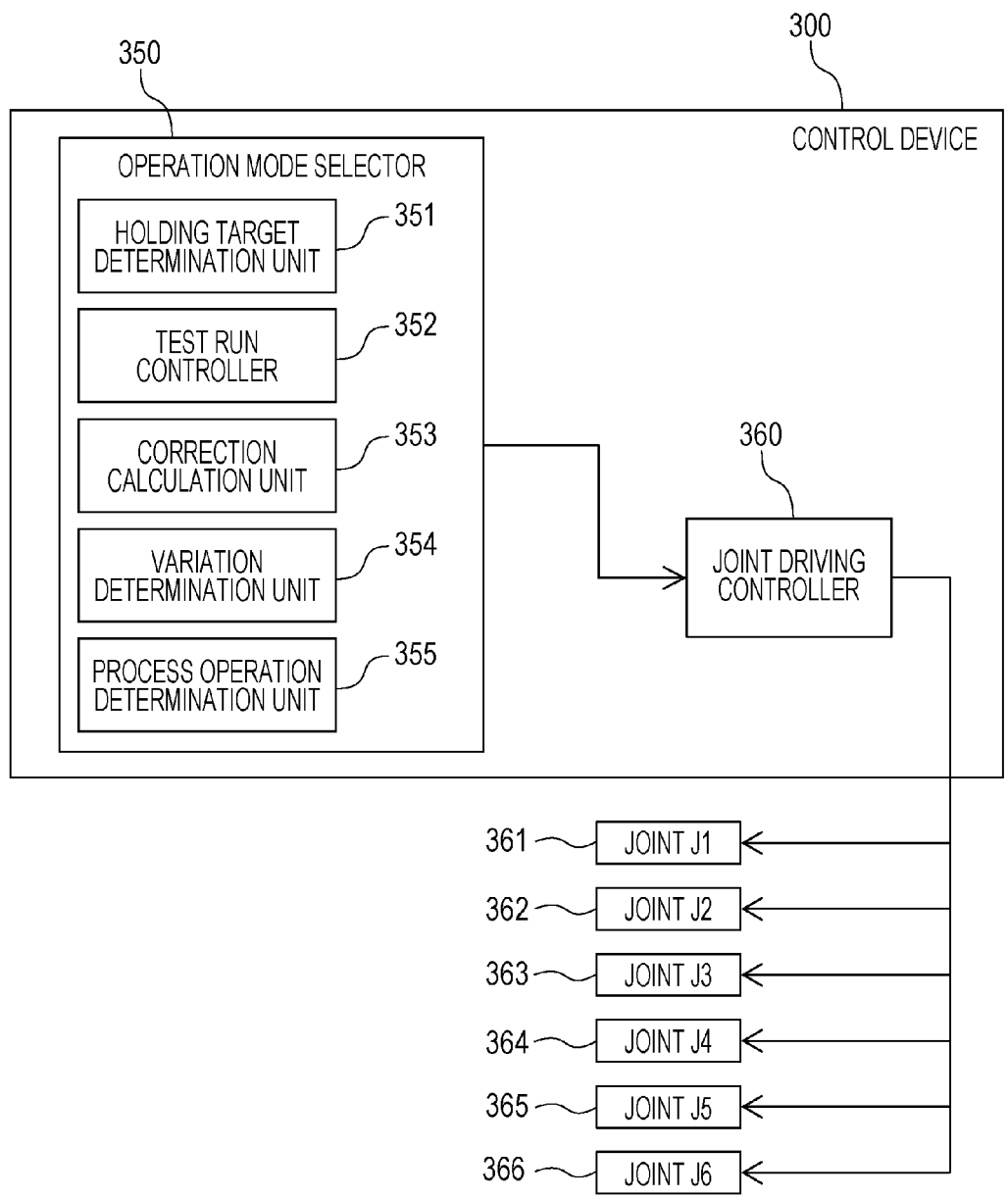
FIG. 4 is a functional block diagram illustrating the configuration of a main portion of the robot apparatus according to the first exemplary embodiment.

FIG. 4 is a functional block diagram illustrating the configuration of a main portion of a robot apparatus according to the first exemplary embodiment. For the control device 300, a block diagram of functions realized by the CPU 301 executing the program 320 is illustrated. Control functions of the control device 300 are roughly classified into the operation mode selector 350 and the joint driving controller 360 (FIG. 2B). In FIG. 4, the joints J1 to J6 of the robot arm 201 are denoted by reference numerals 361 to 366, respectively.

The operation mode selector 350 has functions realized by a holding target determination unit 351, a test run controller 352, a correction calculation unit 353 for bias correction calculation, a variation determination unit 354, and a process operation determination unit 355.

The holding target determination unit 351 included in the operation mode selector 350 determines whether or not fully closed control is necessary in accordance with the content of a task of the robot, especially the difference between holding targets of the robot hand 202.

Here, the probability of whether semi-closed control or fully closed control is selected is considered in accordance with the content of a task, especially a holding target of the robot hand 202. For example, here, suppose the case where an electric screwdriver with a cable is held by the robot hand 202 and a task is performed. For the content of such a task, it is considered that fully closed control is more suitable than semi-closed control. For example, in the case of an electric screwdriver with a cable, external forces are applied to a robot arm by the tension of or vibration from the cable. In the case where semi-closed control is performed for such a task, the tip position may be moved because of the looseness or distortion of a reduction gear caused by, for example, the tension of or vibration from the cable and thus a stopping position or a path of the tip position may be changed. In the case where random external forces are applied to the robot in this manner, the user's desired accuracy may not be ensured, and thus not semi-closed control but fully closed control is necessary.

In addition, in the case where a plurality of work pieces are present that are identically shaped but made of different materials, the masses of the work pieces vary since specific gravities are different. As a result, a stopping position or a path of the tip position changes and not semi-closed control but fully closed control is necessary in order to ensure the user's desired accuracy. In addition, some work pieces include slider mechanisms inside. The center of gravity of such a work piece changes and does not stay at a certain position in a situation where the robot hand is moved, the posture of the robot is changed, the speed of the robot hand is increased or decreased, or the like. In this manner, also in the case where the center of gravity of a work piece, a holding target, is not fixed, not semi-closed control but fully closed control is necessary.

The holding target determination unit 351 selects semi-closed control or fully closed control depending on a holding target in accordance with the content of a task or the difference between holding targets as described above. To select semi-closed control or fully closed control, for example, the content of tasks and holding targets that need fully closed control are preregistered in a storage region. For example, the content of tasks is classified into the content of tasks that need fully closed control, the content of tasks that need semi-closed control, and the content of unknown other tasks and registered. In addition, holding targets are classified into, for example, holding targets that need fully closed control, holding targets that need semi-closed control, and unknown other holding targets and registered. Here, a holding target that should be classified as such a holding target that needs fully closed control (or the content of a task that should be classified as the content of such a task that needs fully closed control) is, for example, a holding target such as the above-described electric screwdriver. Then, which one of semi-closed control and fully closed control should be selected is determined by referring to the content registered in a memory using a code indicating the content of a task to be started or the type of holding target. A table memory or a database for such selection of semi-closed control or fully closed control may be arranged in a storage region of the ROM 302 or the HDD 304. In addition, a user interface may also be provided through which the user may perform specification as necessary, and holding target determination may be performed using not only certain information registered as described above but also using the user interface.

The test run controller 352 has a function through which a test run for selecting semi-closed control or fully closed control is controlled. In addition, a target operation is performed a plurality of times through the function of the test run controller 352. This target operation is the same as the content of an actual task that the robot apparatus 100 is to be caused to perform when the robot apparatus 100 is switched to be in an online state.

In the test run, the path of the robot arm 201, an intermediate point of the path, and the final stopping position are controlled in the same way as the content of an actual task that the robot apparatus 100 is to be caused to perform when the robot apparatus 100 is switched to be in the online state in actual process control as well as in an installation state of the robot apparatus 100. In addition, an object held by the robot hand 202 in the test run is also the same as an object held in an actual task that the robot apparatus 100 is to be caused to perform when the robot apparatus 100 is switched to be in the online state in the actual process control. Note that the actual process control corresponds to, for example, processing in step S9 of FIG. 5, which will be described later.

In addition, the test run according to the first exemplary embodiment is performed a plurality of times. In each test run, the robot arm is caused to perform a certain operation while semi-closed control is being performed on the joints J1 to J6. Then, output values of output-side encoders (236) of the joints J1 to J6 obtained in the plurality of test runs are stored in a certain region of the RAM 303 for a later evaluation. In addition, the target position and the path of the robot arm 201 in the test runs performed are also stored in a certain region of the RAM 303 for a later evaluation.

In the first exemplary embodiment, output values of the output-side encoders (236) obtained in the test runs performed under semi-closed control are recorded in this manner. Thus, the tip position of the robot arm 201 may be evaluated at a specific point during test runs from outputs of the output-side encoders 236 obtained in the test runs. Generally, the tip position of the robot arm 201 is a reference position of the robot arm used in robot control. For example, the center of a surface where an end effector (the robot hand 202) is attached or the like is used. An evaluation of the tip position of the robot arm 201 is an evaluation regarding the bias of or the variation in the tip position at the specific point as described later. Either semi-closed control or fully closed control may be selected in accordance with this evaluation result. In addition, as the specific point where the above-described evaluation is performed, a target position point to which the tip position of the robot arm 201 is to be moved may be used. Alternatively, as in a fourth exemplary embodiment described later, an intermediate point of the path to the target position point to which the tip position of the robot arm 201 is to be moved may also be used as the above-described specific point.

In addition, in the case where semi-closed control is selected and used in an online operation, correction values for driving distances of the joints J1 to J6 used under semi-closed control are generated using output values of the output-side encoders (236) obtained in test runs.

In addition, through the function of the correction calculation unit 353, the bias of the stopping position and the bias of the path are calculated from test run results and also correction values for reducing the biases are calculated. If command values are corrected in accordance with these correction values, the biases may be made significantly small. In addition, the variation determination unit 354 has functions through which the variation in the stopping position and the variation in the past are calculated from test runs, whether or not the variations satisfy the user's desired accuracy is determined, and fully closed control is selected in the case where the variations do not satisfy the user's desired accuracy.

The process operation determination unit 355 has a function through which whether or not fully closed control is necessary is determined in accordance with, for example, the content of a process operation, for example, the scale or the like of the process operation among the content of tasks that the robot apparatus 100 is to be caused to perform. For example, there may be cases where, since the amount of operation necessary for a required task is small, the driving angle of a certain joint of the robot arm 201 needs to be controlled in the range of the looseness or hysteresis of the reduction gear of the joint. Under such circumstances, the variation in the tip position becomes large since the degree of the reproducibility of the tip position of the robot arm 201 is low in the range of the looseness or hysteresis, and thus the user's desired accuracy may not be satisfied under semi-closed control. Thus, for example, in the case where the driving angle of a certain joint of the robot arm 201 is in the range of the looseness or hysteresis in a target position posture, fully closed control is selected. In this manner, the process operation determination unit 355 selects semi-closed control or fully closed control in accordance with a holding process operation, for example, the scale or the like of the holding process operation.

To select semi-closed control or fully closed control from a process operation in this manner, a table memory or a database in which the types or content of process operations are associated with semi-closed control or fully closed control is prepared in a storage region of the ROM 302 or the HDD 304 as described above. The type or content of such a process operation may be expressed by the path, the length of travel, a target position posture, and the like of the robot arm 201 in the process operation, each of which may be associated with semi-closed control or fully closed control and registered.

In addition, the joints 361 to 366 (J1 to J6) of the robot arm 201 are controlled in either of operation methods, semi-closed control and fully closed control, selected as an operation mode through the function of the joint driving controller 360 (FIG. 2B).

The CPU 301 may determine the content of a task that the robot arm 201 is to be caused to perform, from the content of a robot program stored in, for example, the HDD 304 or the like. The robot program is being taught or has already been taught through the teaching pendant 400. Then, semi-closed control or fully closed control may be selected in accordance with the content of a task, especially a holding target of the robot hand 202 or a process operation.

(6) Description of Processes in Robot Control Method

Figure 5:
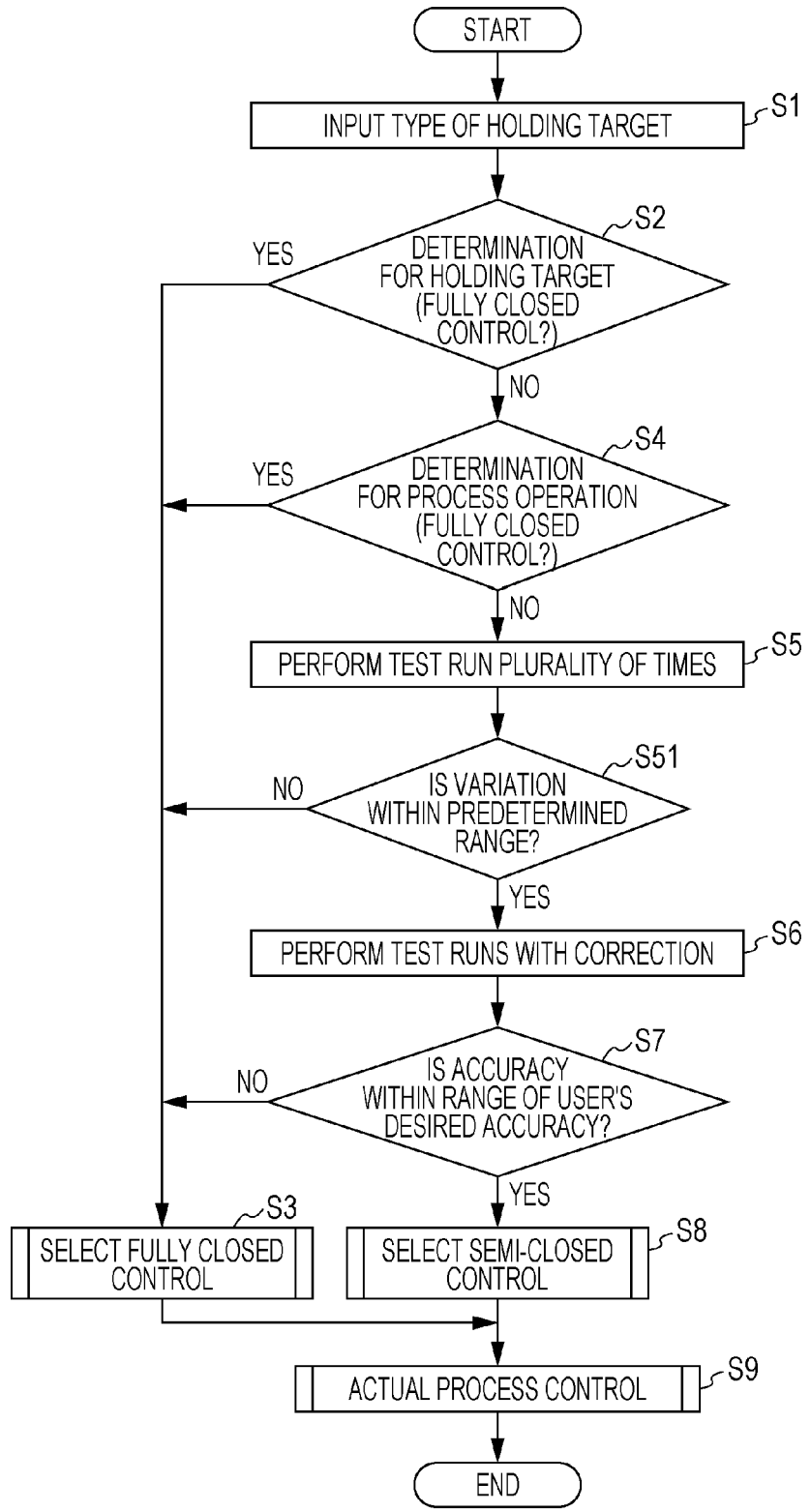
FIG. 5 is a flowchart illustrating a robot control method according to the first exemplary embodiment.

With reference to FIG. 5, a robot control method for controlling an operation of the robot 200 using the CPU 301 executing the program 320 will be described in the first exemplary embodiment. FIG. 5 illustrates a control procedure for selecting semi-closed control or fully closed control in the first exemplary embodiment. In the first exemplary embodiment, control is performed to select semi-closed control or fully closed control for all the joints 361 to 366 of the robot arm 201.

The control procedure of FIG. 5 may be stored as a control program of the CPU 301 in, for example, the ROM 302 or the HDD 304. The control procedure of FIG. 5 is executed for a robot program that has already been programmed, in accordance with teachings to the robot arm 201 through the teaching pendant 400 or through a teaching operation that has already been performed. The CPU 301 determines the content of a task that the robot arm 201 is to be caused to perform, from the content of a robot program stored in, for example, the HDD 304 or the like. The robot program is being taught or has already been taught through the teaching pendant 400. For example, a flowchart of FIG. 5 (also in FIG. 9 and FIG. 12) does not clearly illustrate specific processes of the content of a task; however, the CPU 301 may recognize a holding target or a process operation according to the content of the task at the point in time when the robot program is determined as a processing target.

Steps S1 and S2 of FIG. 5 correspond to the function of the holding target determination unit 351 in FIG. 4. First, in step S1, the type of holding target is input in a robot program that is being taught or has already been taught through the teaching pendant 400 (a holding target input process). As described above, the types of holding targets regarding selection of semi-closed control or fully closed control include holding targets that need fully closed control, holding targets that need semi-closed control, and unknown other holding targets. As a method for inputting the type of holding target, a holding target may be determined in accordance with the content of the robot program as described above or a method may be considered in which the user specifies holding targets one by one through the teaching pendant 400.

In addition, in the case where the robot 200 is provided with a vision system such as a camera, a method may also be used in which a holding target is recognized through image processing. For example, a mark that makes it possible to recognize the above-described type of holding target (or semi-closed control or fully closed control regarding the holding target) is added on a work piece, a holding target of the robot hand 202. This mark may be attached in a freely selected method, such as a peel-and-stick label or sticker application. For example, the camera installed in the robot arm 201 or the like captures an image of a work piece to be held from now, image recognition is performed on the resulting image, and the above-described type of holding target is input. Alternatively, the above-described type of holding target may also be input without using marks by performing image recognition on a feature portion of the work piece, the holding target.

Next, in step S2, it is determined whether or not fully closed control is necessary in accordance with the type of holding target input (or recognized) in step S1 (a determination process in accordance with the type of holding target). In step S2, with reference to the above-described table memory or database arranged in the ROM 302 or the HDD 304, it is determined whether or not fully closed control is necessary in accordance with the type of holding target. When it is determined in step S2 that fully closed control is necessary, fully closed control is selected for the process operation in step S3. When it is determined in step S2 that semi-closed control is possible or it is unknown whether semi-closed control is possible, the process proceeds to step S4.

Note that in the case where fully closed control is selected in step S3, control may be performed such that semi-closed control or fully closed control is selected on a per-joint basis (for example, a second exemplary embodiment, which is to be described later).

Step S4 corresponds to the function of the process operation determination unit 355 in FIG. 4. It is determined in step S4 whether or not fully closed control is necessary in accordance with the type of the process operation in the robot program that is being taught or has already been taught (a determination process in accordance with the process operation). As described above, process operations in which the path or movement of the robot arm 201 needs to be controlled using a region greatly affected by hysteresis or looseness have a low reproducibility and such process operations are often operations with large variations. In step S4, a reference is made to the above-described table memory or database arranged in the ROM 302 or the HDD 304. Then, it is determined whether or not fully closed control is necessary in accordance with the type or content of the process operation, that is, the path, the length of travel, a target position posture, and the like of the robot arm 201 in the process operation. When it is determined in step S4 that fully closed control is necessary, fully closed control is selected for the process operation in step S3. When it is determined that semi-closed control is possible or it is unknown whether semi-closed control is possible, the process proceeds to step S5.

Step S5 corresponds to the function of the test run controller 352 in FIG. 4. In step S5, the process operation in the robot program that is being taught or that has already been taught is performed a plurality of times (a first test run process). This test run is performed to obtain the accuracy of the tip position of the robot arm 201, that is, the bias of and the variation in the tip position of the robot arm 201. The process operation is performed repeatedly a necessary number of times in order to obtain such values. In this test run, as a matter of course, an end effector (the robot hand 202) and a work piece the same as those used in the process operation are used. In addition, during this test run, the robot 200 is operated under semi-closed control and output values of the output-side encoders 236 (FIGS. 2A and 2B) are stored.

Step S51, which is after step S5, corresponds to the function of the variation determination unit 354 in FIG. 4. In step S51, it is determined whether or not fully closed control is necessary from the variation in the tip position of the robot arm 201 calculated using the output values of the output-side encoders 236 recorded in step S5 (a determination process based on variation). In the case where the variation obtained here exceeds the range of the user's desired accuracy, the process proceeds to step S3 and fully closed control is selected for the process operation.

Step S6 corresponds to the function of the test run controller 352 in FIG. 4. In step S6, the tip position of the robot arm 201 is corrected using the function of the correction calculation unit 353 in FIG. 4 and then the test run is performed as in step S5. Here, in step S6, the bias of the tip position of the robot arm 201 is corrected using the output values of the output-side encoders 236 recorded in step S5 and the process operation is performed a plurality of times under semi-closed control (a second test run process). Here, the bias of the tip position of the robot arm 201 obtained in the test runs of step S5 is used in correction performed by the correction calculation unit 353, and a command value for the robot arm 201 is corrected such that the target value matches the bias. As a result, the command value given to the joint driving controller 360 in step S6 becomes equal to a value obtained by correcting the target value. Note that the tip position of the robot arm 201 at a specific point may be determined by solving forward kinematic equations using the angles of the joints obtained from the output-side encoders 236 (FIGS. 2A and 2B). In addition, the bias may be calculated as the difference between the average of tip positions of the robot arm 201 obtained, for example, in the test runs performed in step S5 and the target value.

In step S6, after the command value for the robot arm 201 is corrected by the above-described correction calculation unit 353, the test run is performed a plurality of times. The bias of the rotation angle of each joint during the test runs is obtained using output values of the output-side encoders 236 obtained during the test runs. The bias may be canceled out by correcting this bias. Note that in each of the test runs performed in step S6, in the case where the bias is greater than or equal to a predetermined value, control may also be performed such that the correction value is changed so as to reduce the bias. In addition, to perform correction with high accuracy, steps S5 and S51 may also be repeatedly performed a plurality of times.

In step S7, it is determined whether the accuracy of the tip position of the robot arm 201 is within the range of the user's desired accuracy in the test run process including the correction performed in step S6 (a process for confirming the user's desired accuracy). That is, for the test runs performed in step S6, the bias of and the variation in the tip position of the robot arm 201 are calculated again. As a result, it is determined whether or not the accuracy of the tip position of the robot arm 201 is within the range of the user's desired accuracy. In step S7, in the case where the user's desired accuracy is not satisfied, the process proceeds to step S3 and fully closed control is selected for the process operation. In contrast, in the case where the user's desired accuracy is satisfied, semi-closed control is selected in step S8.

After fully closed control or semi-closed control is selected in step S3 or step S8, the control device 300 performs actual process control in step S9. In the actual process control in step S9, the control device 300 causes the robot arm 201 to perform the content of a task defined by the robot control program. Note that in the case where the robot 200 is controlled under semi-closed control in the actual process control (step S9), as a matter of course, the semi-closed control is performed using the final correction values determined in the test runs performed in step S6.

(7) Effects of First Exemplary Embodiment

As described above, according to the first exemplary embodiment, semi-closed control or fully closed control may be selected in accordance with the type of holding target and the type or content of a process operation, that is, the path, the length of travel, a target position posture, and the like of the robot arm 201 in the process operation. Furthermore, it may be determined whether or not the accuracy of the tip position of the robot arm 201 satisfies the user's desired accuracy by performing the test runs, and semi-closed control or fully closed control may be selected. In particular, in the case where a certain series of processes includes a plurality of process operations, for each of the process operations, the number of process operations performed under fully closed control may be minimized by performing the control according to the first exemplary embodiment. Thus, a total time for the plurality of process operations may be reduced. In addition, for semi-closed control, a bias is obtained by performing test runs and a command value to be given to the joint driving controller 360 of the robot arm 201 is corrected so as to cancel out this bias error. Thus, even in the case where semi-closed control is selected, such a bias error may be significantly reduced. In addition, under semi-closed control, control is performed such that the accuracy of the tip position of a robot arm falls within the range of the user's desired accuracy. In the case where the user's desired accuracy is not satisfied, fully closed control is selected. Thus, robot control may be performed within the range that satisfies the user's desired accuracy. Note that the above-described control may be preferably performed with hardware specifications with which the accuracy achieved under fully closed control is higher than the user's desired accuracy.

Second Exemplary Embodiment

The control method of the first exemplary embodiment is a control method for selecting semi-closed control or fully closed control for all the joints of the robot arm 201. When fully closed control is selected in the control method of the first exemplary embodiment, fully closed control is performed on all the joints. Thus, a reduction in the operation speed may become significantly large.

For example, the robot arm 201 illustrated in FIG. 1 has a serial link mechanism, and thus an operation of a certain joint or vibrations caused by the operation may disturb other joints. In addition, since fully closed control tends to cause vibrations, a longer stabilization time is needed and an operation of the robot 200 tends to be slow. If fully closed control is performed on fewer joints, a reduction in the operation speed may be made smaller. In the second exemplary embodiment, fully closed control or semi-closed control is selected on a per-joint basis and control is performed such that fully closed control is performed on fewer joints.

Note that the second exemplary embodiment has the same hardware and software configurations as those of FIG. 1 to FIG. 3. In addition, the second exemplary embodiment and, likewise, in the following exemplary embodiments, structural members the same as those that have already been described are denoted by the same reference numerals. Unless there is a special necessity, a redundant description will be omitted.

(1) Description of Configuration of Control Device 300

Figure 6:
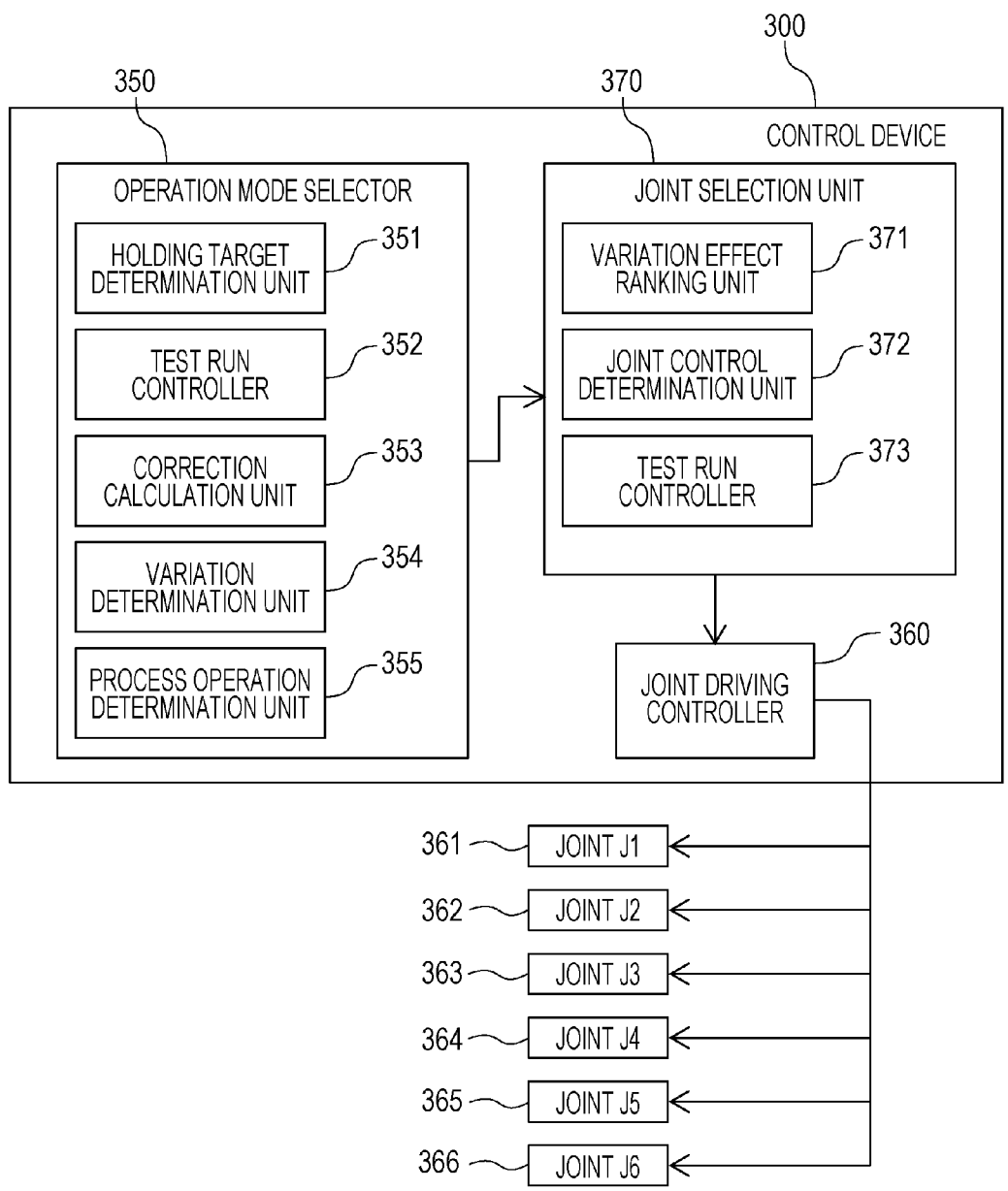
FIG. 6 is a functional block diagram illustrating the configuration of a main portion of a robot apparatus according to a second exemplary embodiment.

FIG. 6 illustrates the configuration of a main portion of a robot apparatus according to the second exemplary embodiment in a form corresponding to that of FIG. 4. Compared with FIG. 4, the difference between the first and second exemplary embodiments is that functions of a joint selection unit 370 are added in FIG. 6.

Figure 7:
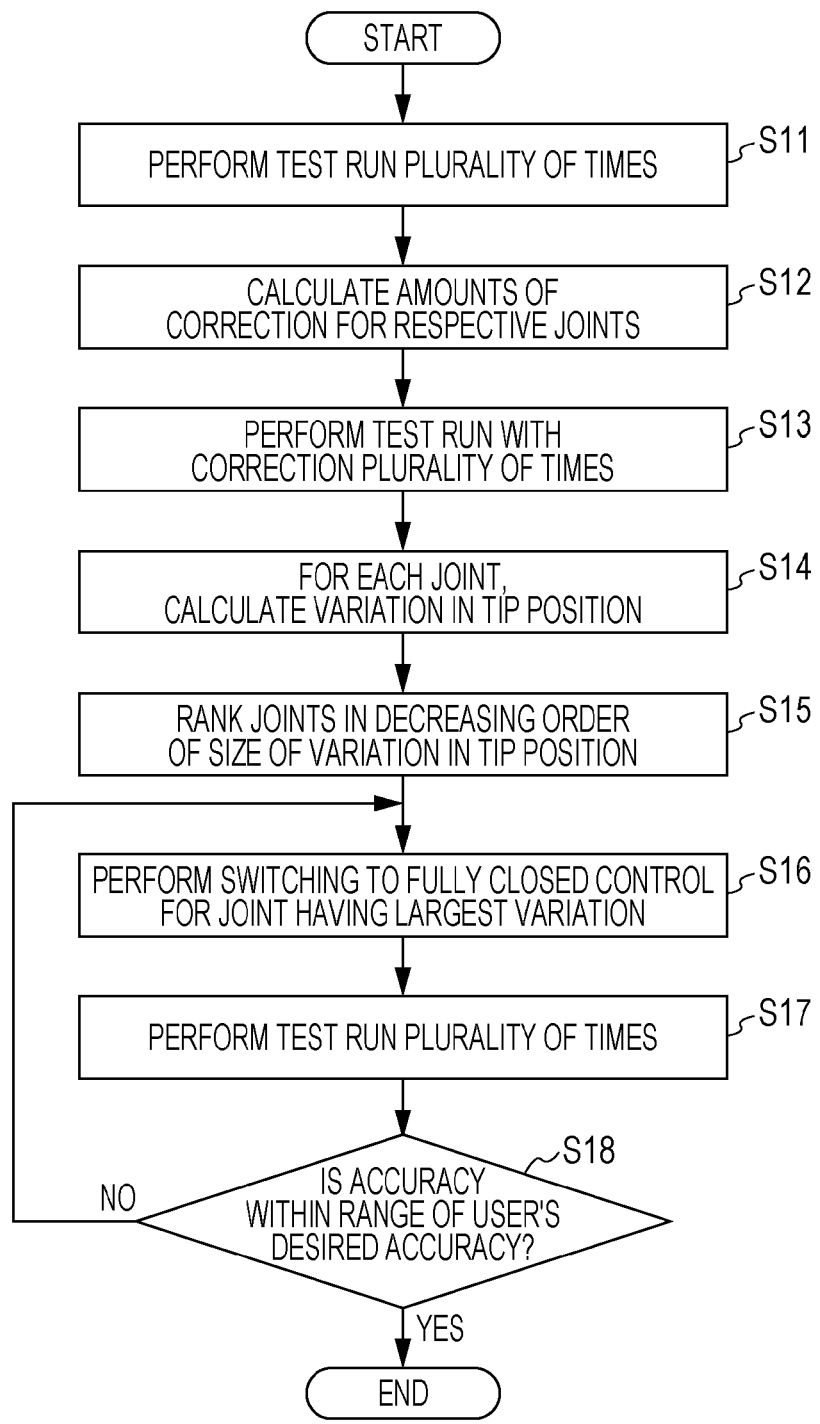
FIG. 7 is a flowchart illustrating a robot control method according to the second exemplary embodiment.

The joint selection unit 370 has a function through which operations are performed as illustrated in FIG. 7, which will be described later, in the case where fully closed control is selected under the control according to the first exemplary embodiment (FIG. 5). In addition, in the case where semi-closed control is selected under the control according to the first exemplary embodiment (FIG. 5), the joint driving controller 360 is commanded to perform semi-closed control on all the joints as described above.

In greater detail, the joint selection unit 370 has functions realized by a variation effect ranking unit 371, a joint control determination unit 372, and a test run controller 373. The reason why the test run controller of the joint selection unit 370 is denoted by 373 is to distinguish the function of this run controller 373 from the function of the test run controller 352 of the operation mode selector 350. Among these test run controllers, the function of the test run controller 352 is realized under control illustrated in FIG. 5 and the function of the test run controller 373 is realized under control illustrated in FIG. 7, which will be described later.

In addition, the variation effect ranking unit 371 has a function through which the degrees of effects caused by the variations at the joints J1 to J6 are ranked by performing test runs to be described later (S13 of FIG. 7: a third test run process, which corresponds to the test run controller 373). Here, "rank" means to prioritize. In the variation effect ranking unit 371, for each of the joints, the variation in the joint angle of the joint is converted into the variation in the tip position. In accordance with sizes of variations in the tip position, the joints J1 to J6 are ranked (prioritized) in decreasing order of effect of the joint on the variation in the tip position. The variation at each joint may be converted into the variation in the tip position of the robot arm 201 by performing calculation based on forward kinematic equations from the posture of the robot arm in the process operation. That is, the variation that occurs at a specific joint may be measured by performing test runs and the variation may be converted into the variation in the tip position of the robot arm 201. In accordance with sizes of variations in the tip position of the robot arm 201, the joints J1 to J6 are ranked in decreasing order of effect of the joint on the variation in the tip position. A ranking result may be recorded by the CPU 301, for example, in a linked list or in a memory area set for an array form. Such a memory area may be set in, for example, the RAM 303 or the like.

Then, through the function of the joint control determination unit 372, a test run (S17 of FIG. 7: a fourth test run process, which corresponds to the test run controller 373) is performed a plurality of times and control is performed such that fully closed control is selected for joints in a sequential manner from the joint having the greatest effect in decreasing order of effect.

(2) Description of Processes in Robot Control Method

With reference to FIG. 7, a robot control method for controlling an operation of the robot 200 using the CPU 301 executing the program 320 will be described in the second exemplary embodiment. A control procedure of FIG. 7 is executed in the case where fully closed control is selected in step S3 of FIG. 5 in the first exemplary embodiment and a description is made such that step S3 of FIG. 5 is replaced with the control procedure of FIG. 7.

First, in step S11 of FIG. 7, a test run for a subject operation is performed a plurality of times under semi-closed control to correct the biases of joint angles (a third test run process). This function corresponds to the function of the test run controller 373 in FIG. 6.

Next, in step S12, for each of the joints J1 to J6, the bias of the joint angle of the joint is calculated and the amount of correction is calculated for the joint (a correction calculation process). This function corresponds to the function of the correction calculation unit 353 in FIG. 6.

Next, in step S13, a test run for the subject operation is performed a plurality of times under semi-closed control in which the amounts of correction have been reflected (a fourth test run process). This function corresponds to the function of the test run controller 373 in FIG. 6.

In step S14, for each of the joints J1 to J6, the variation at the joint is calculated from test run results obtained in step S13. Then, the variation at each joint is converted into the variation in the tip position of the robot arm 201. This conversion into the variation in the tip position of the robot arm 201 is performed through calculation based on forward kinematic equations from the posture in the subject operation. Then, in step S15, the joints J1 to J6 are ranked (prioritized) in decreasing order of size of the variation in the tip position in accordance with sizes of variations in the tip position obtained in step S14. The functions realized in steps S14 and S15 correspond to the function of the variation effect ranking unit 371 in FIG. 6.

In step S16, in accordance with a variation ranking result obtained in step S15, one joint having the greatest effect on the variation in the tip position is selected from among joints for which fully closed control has not yet been selected and fully closed control is selected for this joint (fully closed control is added for the joint). Here, suppose that the joints for which fully closed control has not been selected among the other joints are in a state where semi-closed control is selected.

Then, in step S17, a test run for the subject process operation is performed repeatedly a plurality of times (a fifth test run process).

In step S18, a test run result obtained in step S17 is analyzed and it is determined whether the accuracy of the tip position is within the range of the user's desired accuracy (an accuracy determination process). In the case where the user's desired accuracy is satisfied, the control procedure of FIG. 7 ends. In addition, although not clearly illustrated, in the case where, in step S18, whether or not fully closed control is selected has already been determined for all the joints and fully closed control has already been selected for all the joints, the procedure also ends. In contrast, in the case where the user's desired accuracy is not satisfied, the process returns to step S16, one joint (for which fully closed control has not yet been selected) having the next greatest degree of effect is selected in accordance with the above-described ranking result, and fully closed control is selected for this joint.

In the case where a result that satisfies the user's desired accuracy is obtained in step S18, fully closed control is performed on only some joints having a great degree of effect on the variation in the tip position of the robot arm 201 among the joints J1 to J6. Semi-closed control is selected for the other joints.

(3) Effects of Second Exemplary Embodiment

As described above, in the case where semi-closed control (in which correction has been performed) may not be selected in accordance with the type of holding target or the content of a process operation under the control according to the first exemplary embodiment, fully closed control may be selected for joints in a sequential manner in decreasing order of degree of effect of the joint on the variation in the tip position of the robot arm 201. In that case, for each joint, the variation at the joint obtained in the test runs performed under semi-closed control is converted into the variation in the tip position. The joints are ranked in decreasing order of degree of effect of the joint on the variation in the tip position, and fully closed control is selected for joints in a sequential manner from the joint having the largest variation while test runs are further performed. When fully closed control is selected for all the joints or when the user's desired accuracy is satisfied, the control ends. As described above, the probability may increase that fully closed control is performed on fewer joints and a reduction in the operation speed of a robot apparatus may be made smaller.

Third Exemplary Embodiment

In a third exemplary embodiment, to move the tip of the robot arm 201, fully closed control or semi-closed control is selected by taking a necessary accuracy direction into consideration. In a task, such as assembly using the robot 200, there may be cases where the accuracy needed may vary depending on the direction in which the tip of the robot arm 201 moves.

For example, FIG. 8A illustrates the case where the robot 200 performs a task in which the work piece W1 held by the robot hand 202 is inserted into an oval slot provided in a work piece W20. The configuration of the robot 200 in FIG. 8A is the same as that of the robot 200 in FIG. 1.

The work piece W20 in FIG. 8A has an oval slot in the center thereof, as illustrated in its front view in FIG. 8B, the both ends of the oval slot being surrounded by, for example, sleeves W21 and W22 having semicircular arc shapes. The work piece W1 is a cylindrical part that fits into the slot of the work piece W20. In this manner, for a fitting configuration whose basic elements are a slot and a cylindrical part, a positioning accuracy is generally stricter in a lateral direction of the slot than in a longitudinal direction.

Thus, in the case where the robot 200 is caused to perform a fitting operation as illustrated in FIG. 8A, the required positioning accuracy of the tip of the robot arm 201 tends to be relatively low in the longitudinal direction of the above-described slot and tends to be higher in the lateral direction than in the longitudinal direction. In the following, in FIG. 8A, the direction in which a higher accuracy is necessary is referred to as a first direction (corresponding to the lateral direction of the above-described slot) and the direction in which the next highest accuracy is necessary is referred to as a second direction (corresponding to the longitudinal direction of the above-described slot). The user's desired accuracy also includes the user's desired accuracy in the first direction and the user's desired accuracy in the second direction.

In the third exemplary embodiment, the variations in different directions in a space where the robot arm 201 is caused to operate are calculated and the user's desired accuracies, which are different accuracies, are used for the respective variations calculated in the respective directions. A control procedure in which different control is performed in the first direction and in the second direction, as described in the following (1) and (2), may be considered as a modification of the first exemplary embodiment and as a modification of the second exemplary embodiment.

(1) As Modification of First Exemplary Embodiment

Figure 9:
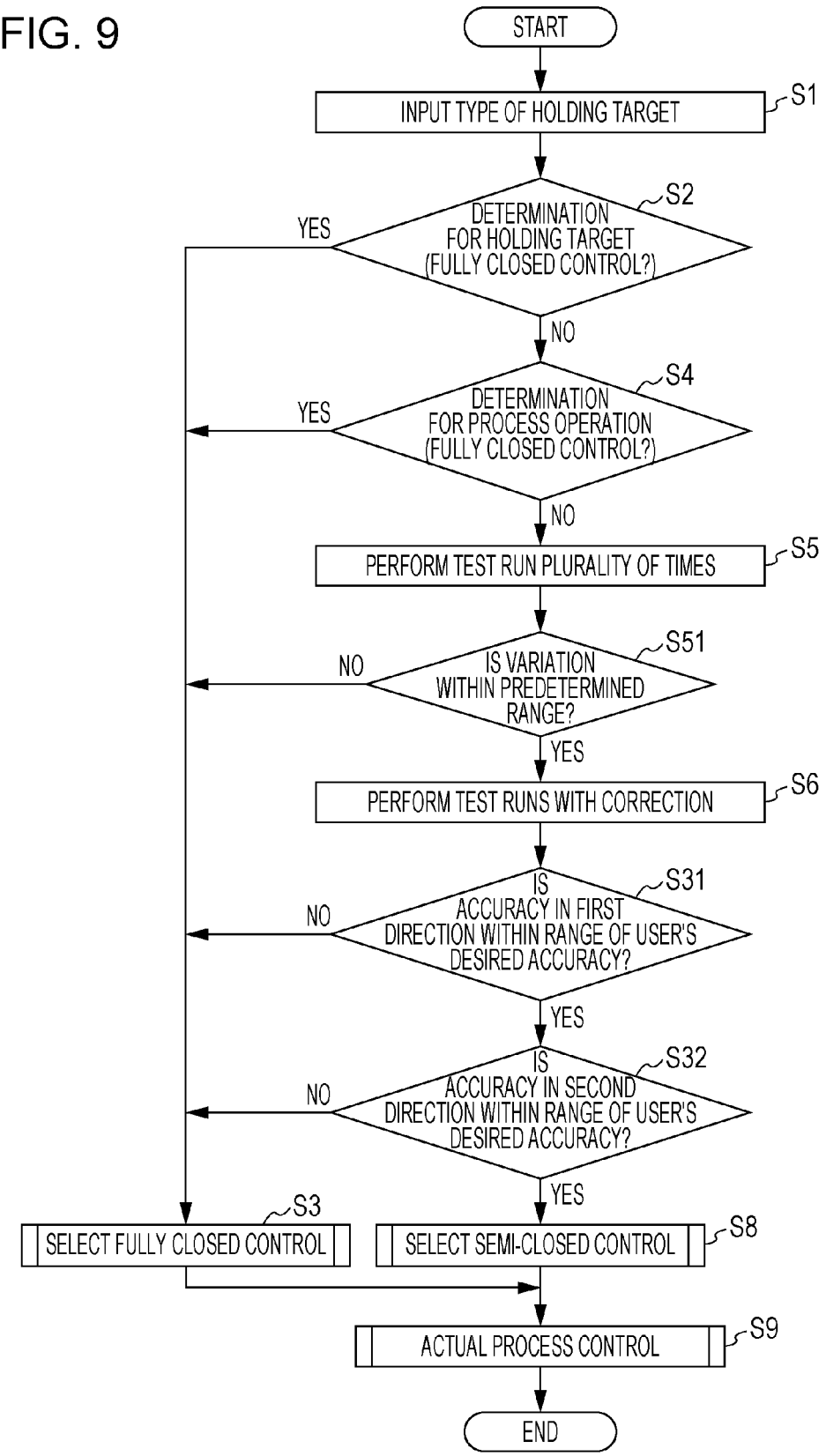
FIG. 9 is a flowchart illustrating a robot control method according to the third exemplary embodiment.

FIG. 9 illustrates a control procedure in the case where the third exemplary embodiment is applied as a modification of the first exemplary embodiment. In the control procedure of FIG. 9, as in the case of the first exemplary embodiment, control is performed in which either semi-closed control or fully closed control is selected for all the joints of the robot arm 201 in a collective manner. In this case, in test runs performed under semi-closed control, a determination is performed for the accuracy in the first direction and for the accuracy in the second direction individually. The configurations of FIG. 2A to 3 are also applied to the third exemplary embodiment. FIG. 9 describes the control procedure of the third exemplary embodiment, which corresponds to FIG. 5 of the first exemplary embodiment. The steps the same as those of FIG. 5 are denoted by the same step numbers and a detailed description thereof will be omitted.

In addition, the content of a target task of the robot 200 in the control procedure of FIG. 9 is the same as the content of the task illustrated in FIGS. 8A and 8B. Then, for control performed for the tip position of the robot arm 201, suppose that the user's desired accuracy in the above-described first direction (corresponding to the lateral direction of the slot of the work piece W20) is higher than the user's desired accuracy in the second direction (corresponding to the longitudinal direction of the slot of the work piece W20).

Steps S1 to S6 of FIG. 9 are the same as those in the control procedure of FIG. 5 and the same processing is performed. In step S6, the bias obtained in step S5 is corrected and the process operation is performed a plurality of times under semi-closed control (the second test run process). In steps S31 and S32, a determination is performed in the first and second directions individually.

That is, in step S31, the bias and variation in the first direction are obtained from the test runs (S6) and it is determined whether the accuracy of positioning of the tip of the robot arm 201 is within the range of the user's desired accuracy (the user's desired accuracy confirmation process in the first direction). Here, in the case where the user's desired accuracy is not satisfied, the process proceeds to step S3 and fully closed control is selected as a control system for each joint. In contrast, in the case where the user's desired accuracy is satisfied, the process proceeds to step S32.

In step S32, likewise, the bias and variation in the second direction are obtained from the test runs (S6) and it is determined whether the accuracy of positioning of the tip of the robot arm 201 is within the range of the user's desired accuracy (the user's desired accuracy confirmation process in the second direction). Here, in the case where the user's desired accuracy is not satisfied, the process proceeds to step S3 and fully closed control is selected as a control system for each joint. In contrast, in the case where the user's desired accuracy is satisfied, the process proceeds to step S8 and semi-closed control is selected as a control system for each joint.

After a certain control system is selected for the joints in step S3 or step S8, actual process control is performed in step S9 as in the case of the first exemplary embodiment. In the case where semi-closed control is selected in step S8 of FIG. 9, for each of the joints J1 to J6, the amount of correction the same as that used in the test runs (S6) is applied to control the joint in the actual process control (S9) as in the case of the first exemplary embodiment.

(2) As Modification of Second Exemplary Embodiment

Figure 10:
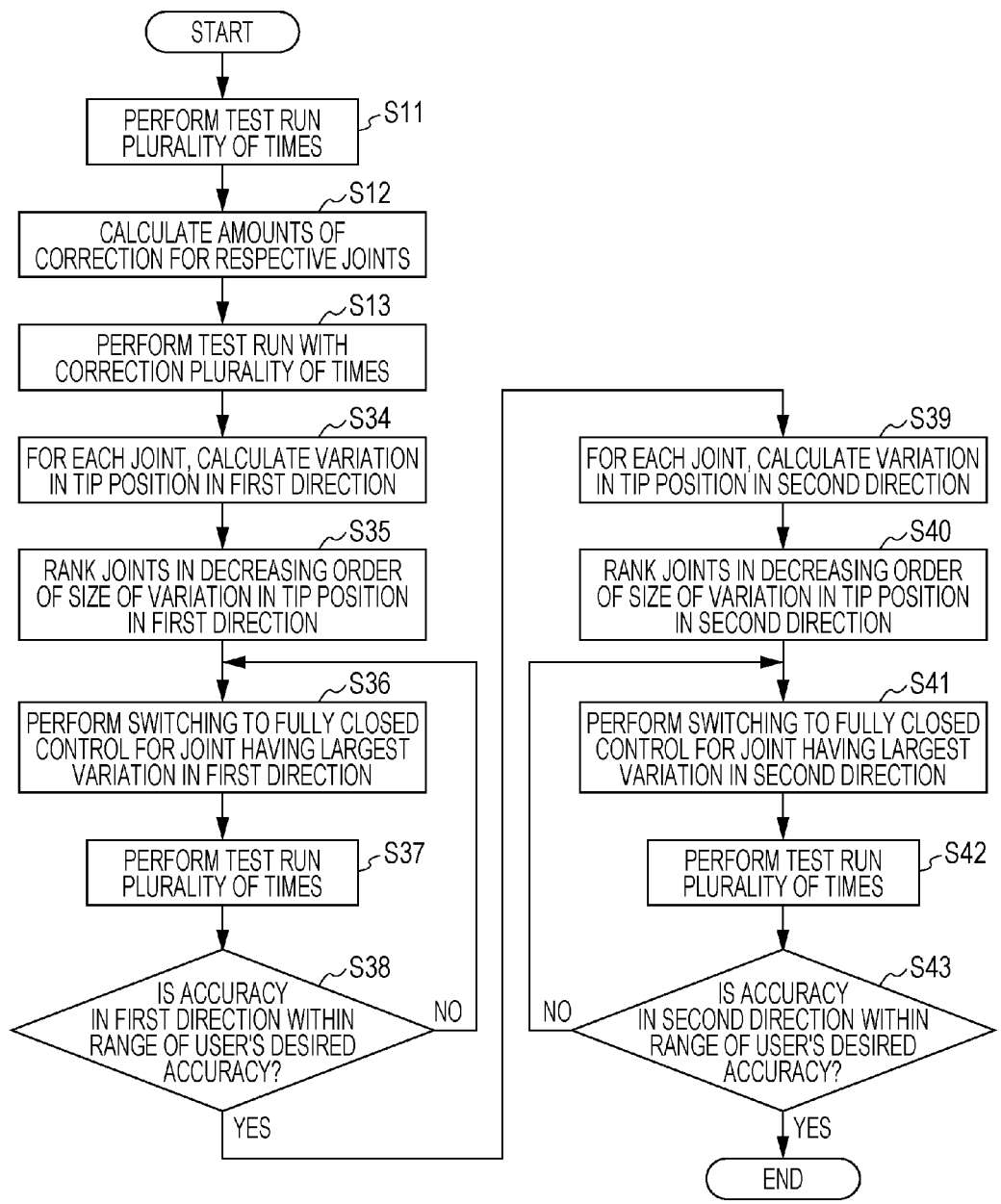
FIG. 10 is a flowchart illustrating another robot control method according to the third exemplary embodiment.

FIG. 10 illustrates a control procedure in the case where the third exemplary embodiment is applied as a modification of the second exemplary embodiment. In the control procedure of FIG. 10, as in the case of FIG. 7 of the second exemplary embodiment, as processing for replacing step S3 of FIG. 5, control is performed in which either semi-closed control or fully closed control is selected on a per-joint basis for the joints of the robot arm 201. In that case, it is determined whether the user's desired accuracies are satisfied in the above-described first and second directions. In the case where such an accuracy is not satisfied, control is switched to fully closed control for joints, in the rankings, in decreasing order of effect of the joint on the variation in the tip position of the robot arm 201.

In addition, the content of a target task of the robot 200 in the control procedure of FIG. 10 is the same as the content of the task illustrated in FIGS. 8A and 8B. Then, for control performed for the tip position of the robot arm 201, suppose that the user's desired accuracy in the above-described first direction (corresponding to the lateral direction of the slot of the work piece W20) is higher than the user's desired accuracy in the second direction (corresponding to the longitudinal direction of the slot of the work piece W20).

Steps S11 to S13 of FIG. 10 are the same as those in the control procedure of FIG. 7 and the same processing is performed. Steps S34 to S38 and steps S39 to S43 of FIG. 10 correspond to steps S14 to S18 of FIG. 7. Steps S34 to S38 and steps S39 to S43 of FIG. 10 differ from steps S14 to S18 of FIG. 7 in that steps S14 to S18 of FIG. 7 are performed for the user's desired accuracy in the first direction and for the user's desired accuracy in the second direction.

First, in step S34, for each of the joints J1 to J6, the variation at the joint is calculated from test run results obtained in step S13. Then, the variation at the joint is converted into the variation in the tip position of the robot arm 201 in the first direction. This conversion into the variation in the tip position of the robot arm 201 is performed by performing calculation based on forward kinematic equations from the posture in the subject operation and by performing geometric conversion in the first direction. Then, in step S35, the joints J1 to J6 are ranked (prioritized) in decreasing order of size of the variation in the tip position in accordance with sizes of variations in the tip position obtained in step S34 (a first-direction variation ranking process).

In step S36, one joint having the greatest effect on the variation in the tip position is selected in accordance with a variation ranking result obtained in step S35 and fully closed control is selected for this joint (a fully closed control addition process for a certain joint in the first direction). Here, suppose that the joints for which fully closed control has not been selected among the other joints are in a state where semi-closed control is selected (the fully closed control addition process for the certain joint in the first direction).

Then, in step S37, test runs are performed in which the subject process operation is performed a plurality of times (a sixth test run process).

In step S38, a test run result obtained in step S37 is analyzed and it is determined whether the accuracy of the tip position in the first direction is within the range of the user's desired accuracy (an accuracy determination process in the first direction). In the case where the user's desired accuracy is satisfied, the process proceeds to step S39. Although not clearly illustrated, in the case where, in step S38, whether or not fully closed control is selected has already been determined for all the joints and fully closed control has already been selected for all the joints, the process of FIG. 10 ends. In contrast, in the case where the user's desired accuracy is not satisfied, the process returns to step S36, one joint (for which fully closed control has not yet been selected) having the next greatest degree of effect on the accuracy of the tip position in the first direction is selected in accordance with the above-described ranking result, and fully closed control is selected.

In steps S39 to S43, processing the same as that in steps S34 to S38 is performed for the accuracy of the tip position in the second direction. First, in step S39, for each joint, the tip position of the robot arm 201 is calculated and the variation at the joint in the second direction is calculated (a tip-position variation calculation process in the second direction).

Next, the joints J1 to J6 are ranked (prioritized) in decreasing order of effect of the joint on the variation in the tip position in accordance with sizes of variations in the tip position of the robot arm 201 obtained in step S39 (a variation ranking process in the second direction).

Then, in step S41, one joint having the greatest effect on the variation in the tip position is added, in accordance with the variation rankings obtained in step S40, to joints for which fully closed control is performed such that fully closed control is selected for this joint (a fully closed control addition process for a certain joint in the second direction).

Next, in step S42, test runs are performed in which the subject process operation is performed a plurality of times (a seventh test run process).

Furthermore, a test run result obtained in step S42 is analyzed and it is determined whether the accuracy of the tip position of the robot arm 201 in the second direction is within the range of the user's desired accuracy (an accuracy determination process in the second direction). Here, in the case where the user's desired accuracy is satisfied, the process ends. In the case where the user's desired accuracy is not satisfied, the process returns to step S41 and another joint is added to joints for which fully closed control is performed. In addition, in the case where fully closed control is selected for all the joints in step S43, the process ends.

(3) Effects of Third Exemplary Embodiment

As described above, in the case where control according to the first exemplary embodiment or the second exemplary embodiment is performed, semi-closed control or fully closed control is selected by performing a determination process in each of the first and second directions. The user's desired accuracies, which are different accuracies, are set in the respective first and second directions. Whether or not fully closed control is to be performed is determined for all the joints in the control procedure of FIG. 9. In the control procedure of FIG. 10, in each of the first and second directions, fully closed control is selected for joints in decreasing order of degree of effect of the joint on the variation in the tip position. Then, when the user's desired accuracies are satisfied in the first direction and the second direction, the process ends. Under such control, the accuracy of the tip position of the robot arm 201 is satisfied in the first direction and the second direction in which the user's desired accuracies, which are different accuracies, are set, semi-closed control may be selected for as many joints as possible, and fully closed control may be performed on fewer joints. Consequently, a reduction in the operation speed of the robot apparatus 100 may be made smaller.

Note that, in the third exemplary embodiment, the description above is made such that the directions in which the user's desired accuracies, which are different accuracies, are set are the first direction and the second direction; however, control similar to that described above may be performed when there are three or more directions in which the user's desired accuracies, which are different accuracies, are set. Specifically, certain steps corresponding to steps S31 and S32, S34 to S38, and S39 to S43 for performing processing for the first and second directions in FIG. 9 and FIG. 10 have only to be prepared for three or more target directions.

Fourth Exemplary Embodiment

In the above-described first to third exemplary embodiments, the variation in the tip position of the robot arm 201 is evaluated at a specific point in a specific process operation, for example, a position point that is the final position, it is determined whether or not the user's desired accuracy or accuracies are satisfied, and semi-closed control or fully closed control is selected.

However, there may be the case where, depending on a process operation, (the tip position of) the robot arm 201 is caused to operate along a certain path, that is, there may be the case where, depending on the content of a task, it is desired that more weight be placed on the variation or the user's desired accuracy at an intermediate point of the path. Thus, control may be considered in which not only the position point but also an intermediate point of a certain path is employed as the above-described specific point. Generally, to obtain a certain path, a starting point, a position point (an ending point), and one or more intermediate points are specified and the certain path is generated so as to pass through these points smoothly. In correction for an intermediate point, which will be described later, the point closest to the intermediate point is processed as an evaluation target.

Figure 12:
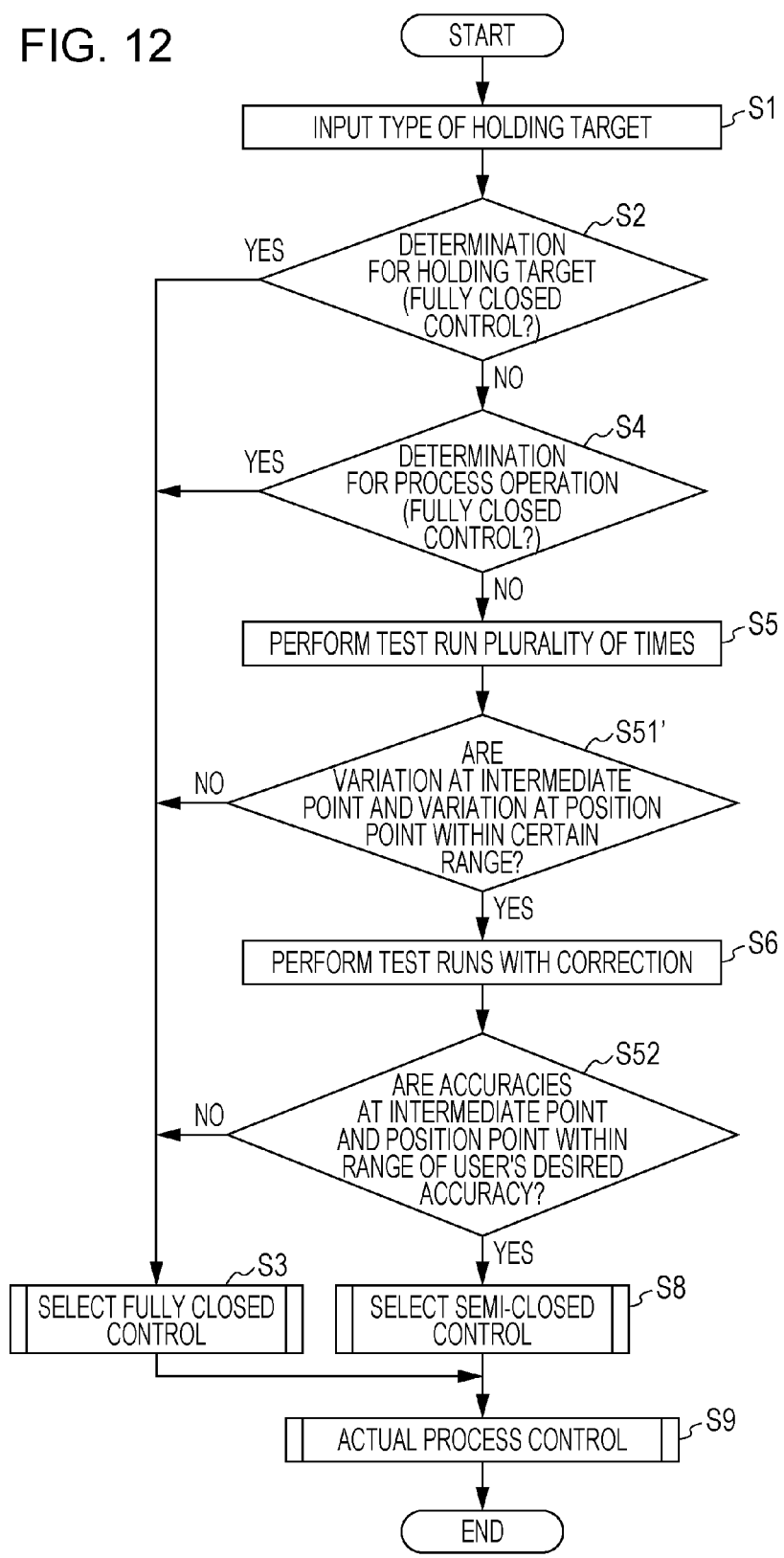
FIG. 12 is a flowchart illustrating a robot control method according to the fourth exemplary embodiment.
Figure 13:
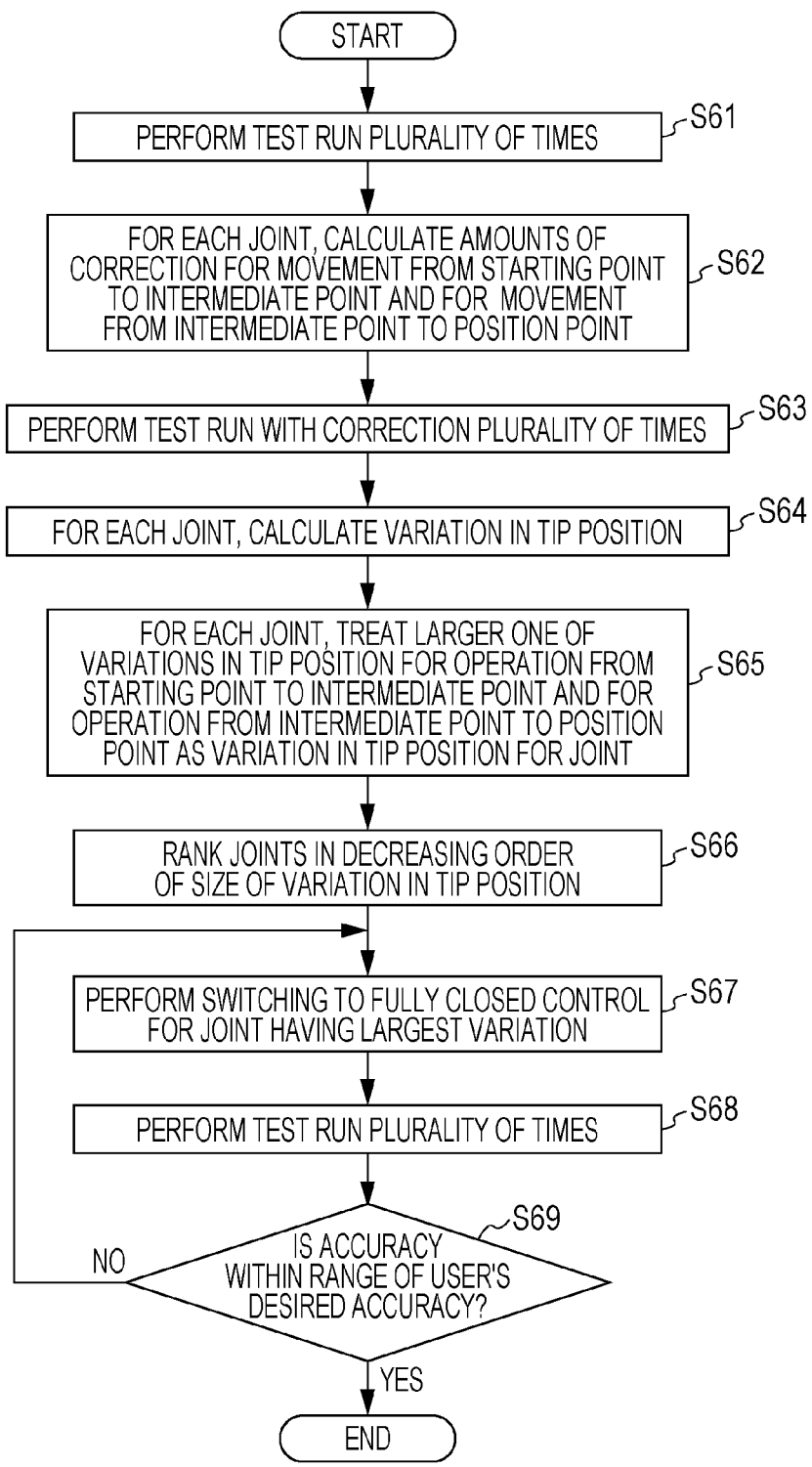
FIG. 13 is a flowchart illustrating another robot control method according to the fourth exemplary embodiment.

The fourth exemplary embodiment illustrates a control procedure in which semi-closed control or fully closed control is selected in accordance with the variation not only at a position point but also at an intermediate point of a path and the user's desired accuracy. In the fourth exemplary embodiment, as in the case of the third exemplary embodiment, only control procedures are illustrated in FIG. 12 and FIG. 13. The other configurations are the same as those of the first exemplary embodiment and the second exemplary embodiment.

Figure 11:
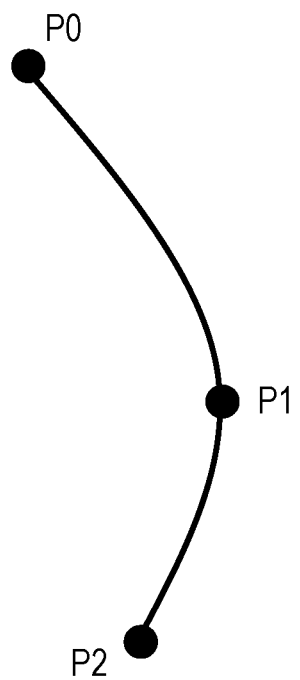
FIG. 11 is an illustrative diagram illustrating the path along which a tip portion of a robot apparatus according to a fourth exemplary embodiment is operated.

FIG. 11 illustrates an example of a path along which the tip of the robot arm 201 is operated in the fourth exemplary embodiment. Along the path illustrated in FIG. 11, the tip of the robot arm 201 is moved from a starting point P0 via an intermediate point P1 and positioned at a position point P2. In the first to third exemplary embodiments, switching is performed between semi-closed control and fully closed control in accordance with the variation and accuracy at the position point P2, which is a final position point. However, depending on a process operation, there may be the case where the accuracy at an intermediate point is necessary. In the fourth exemplary embodiment, semi-closed control or fully closed control is selected in accordance with not only the variation and accuracy at the position point P2 but also the variation and accuracy at the intermediate point P1.

(1) As Modification of First Exemplary Embodiment

FIG. 12 illustrates a control procedure in the case where the fourth exemplary embodiment is applied as a modification of the first exemplary embodiment. In the control procedure of FIG. 12, as in the case of the first exemplary embodiment, control is performed in which either semi-closed control or fully closed control is selected for all the joints of the robot arm 201 in a collective manner. In that case, semi-closed control or fully closed control is selected in accordance with not only the variation and accuracy at the position point P2 but also the variation and accuracy at the intermediate point P1. FIG. 12 describes the control procedure of the fourth exemplary embodiment, which corresponds to FIG. 5 of the first exemplary embodiment. The steps the same as those of FIG. 5 are denoted by the same step numbers and a detailed description thereof will be omitted. Note that the content of a target task of the robot 200 in the control procedure of FIG. 12 is the same as, for example, the content of the task illustrated in FIG. 1.

Steps S1 to S5 of FIG. 12 are the same as those in the control procedure of FIG. 5 and the same processing is performed. In the fourth exemplary embodiment, steps S51' and S52 are steps different from the steps of the first exemplary embodiment.

In step S51', the variation in the tip position of the robot arm 201 during operation are obtained at the intermediate point P1 and at the position point P2 in test runs (S5). If the variations are within the range of certain values, the process proceeds to step S6. In the case where the variation at the intermediate point P1 or at the position point P2 exceeds the range of certain values, the process proceeds to step S3 and fully closed control is selected as a control system for each joint (a determination process in which an intermediate point is taken into consideration). Note that, in this case, the variation acceptable at the intermediate point P1 does not have to be the same as the variation acceptable at the position point P2. Depending on a use state, such variations may be individually set through, for example, the teaching pendant 400 or the like.

Next, as in the case of step S6 of the first exemplary embodiment, test runs with correction are performed (the second test run process). Then, in step S52, if the accuracies of the tip position of the robot arm 201 at the intermediate point P1 and at the position point P2 are within the range of the user's desired accuracy, semi-closed control is selected in step S8.

In contrast, in step S52, in the case where the accuracies of the tip position of the robot arm 201 at the intermediate point P1 and at the position point P2 do not satisfy the user's desired accuracy, the process proceeds to step S3 and fully closed control is selected as a control system for each joint (the determination process in which an intermediate point is taken into consideration).

As described above, after fully closed control or semi-closed control is selected in step S3 or step S8, actual process control is performed in step S9. Note that in the case where semi-closed control is selected in step S8 of FIG. 12, for each of the joints J1 to J6, the amount of correction the same as that used in the test runs (S6) is applied to control the joint in the actual process control (S9) as in the case of the first exemplary embodiment.

As described above, according to the fourth exemplary embodiment, a certain accuracy desired by the user is satisfied also at the intermediate point P1 and the probability may be increased that semi-closed control is performed as much as possible in robot control.

(2) As Modification of Second Exemplary Embodiment

FIG. 13 illustrates a control procedure in the case where the fourth exemplary embodiment is applied as a modification of the second exemplary embodiment. In the control procedure of FIG. 13, as processing for replacing step S3 of FIG. 5, control is performed in which either semi-closed control or fully closed control is selected for the joints of the robot arm 201 on a per-joint basis as in the case of FIG. 7 of the second exemplary embodiment. In that case, control is performed in which semi-closed control or fully closed control is selected in accordance with not only the variation and accuracy at the position point P2 but also the variation and accuracy at the intermediate point P1. The joints are ranked (prioritized) in accordance with the variation in the tip position of the robot arm 201 not only at the position point P2 but also at the intermediate point P1. Then, it is determined whether the user's desired accuracy is satisfied. In the case where the user's desired accuracy is not satisfied, control is switched to fully closed control for joints, in the rankings, in decreasing order of effect of the joint on the variation in the tip position of the robot arm 201. Note that the content of a target task of the robot 200 in the control procedure of FIG. 13 is the same as, for example, the content of the task illustrated in FIG. 1.

For example, steps S61 to S64 of FIG. 13 are processing corresponding to steps S11 to S14 of FIG. 7. Since FIG. 13 differs from FIG. 7 in detail in some points, numerals in the sixties are used as step numbers.

First, in step S61 of FIG. 13, test runs are performed under semi-closed control to correct the biases of joint angles by performing a subject operation a plurality of times from the starting point P0 to the position point P2 via the intermediate point P1 (an eighth test run process).

Next, in step S62, for each of the joints J1 to J6, the bias of the joint angle of the joint is calculated and the amount of correction is calculated for the joint (the correction calculation process). Here, the amount of correction for the movement from the starting point P0 to the intermediate point P1 is often different from that for the movement from the intermediate point P1 to the position point P2.

In step S63, test runs are performed under semi-closed control in which the amounts of correction obtained in step S62 have been reflected, such that the subject operation is performed a plurality of times (a ninth test run process).

Next, for each of the joints J1 to J6, the variation at the joint is calculated from test run results obtained in step S63. Next, the variation at each joint is converted into the variation in the tip position of the robot arm 201. As described above, this conversion into the variation in the tip position of the robot arm 201 may be performed through calculation based on forward kinematic equations from the posture in the subject operation. For each joint, the variation in the tip position of the robot arm 201 is calculated at the intermediate point P1 and also at the position point P2 and the larger one of the variations obtained at the intermediate point P1 and the position point P2 is treated as, for the joint, the variation in the tip position of the robot arm 201.

Next, the joints J1 to J6 are ranked (prioritized) in decreasing order of effect of the joint on the variation in the tip position of the robot arm 201 in accordance with sizes of variations in the tip position of the robot arm 201 obtained in step S64 (the variation ranking process).

In step S67, one joint having the greatest effect on the variation in the tip position is selected in accordance with a variation ranking result obtained in step S65 and fully closed control is selected for this joint (the fully closed control addition process for a joint). Then, in step S68, test runs are performed in which the subject process operation is performed a plurality of times (a tenth test run process).

In step S69, the variations obtained in the test runs performed in step S68 are analyzed and it is determined whether the accuracy of the tip position is within the range of the user's desired accuracy (the accuracy determination process). In the case where the user's desired accuracy is satisfied, the control procedure of FIG. 13 ends. In the case where the user's desired accuracy is not satisfied, the process returns to step S67, one joint (for which fully closed control has not yet been selected) having the next greatest degree of effect is selected in accordance with the above-described ranking result, and fully closed control is selected for this joint. In addition, in the case where, in step S69, whether or not fully closed control is selected has already been determined for all the joints and fully closed control has already been selected for all the joints, the process also ends.

(3) Effects of Fourth Exemplary Embodiment

According to the fourth exemplary embodiment, control may be performed in which either semi-closed control or fully closed control is selected by performing a determination in accordance with not only the variations in and accuracies of the tip position of the robot arm 201 at specific points including not only the position point (P2) but also the intermediate point (P1). Selection of semi-closed control or fully closed control is performed for all the joints in a collective manner (FIG. 12) or on a per-joint basis (FIG. 13). In particular, in the case where selection control is performed on a per-joint basis (FIG. 13), for each joint, the variation at the joint obtained in the test runs performed under semi-closed control is converted into the variation in the tip position. The joints are ranked in decreasing order of degree of effect of the joint on the variation in the tip position, and fully closed control is selected for joints in a sequential manner from the joint having the largest variation. Fully closed control or semi-closed control is selected on a per-joint basis so as to satisfy the user's desired accuracy. As described above, according to the fourth exemplary embodiment, a certain accuracy desired by the user is satisfied also at the intermediate point P1 and the probability may be increased that semi-closed control is performed as much as possible in robot control. Furthermore, the user's desired accuracy required for the robot apparatus 100 is satisfied and, at the same time, fully closed control may be performed on fewer joints. Thus, a reduction in the operation speed may be made smaller.

In addition to the control according to the fourth exemplary embodiment, control as described in the third exemplary embodiment may also be performed in which the tip position of the robot arm 201 is evaluated at an intermediate point and at a position point and the user's desired accuracies in the first and second directions are satisfied. For example, in FIG. 12, in the case where the variations in the tip position of the robot arm 201 are evaluated at the intermediate point and the position point in steps S51' and S52, the variations are evaluated in a plurality of different directions as illustrated in steps S31 and S32 of FIG. 9. In addition, in the case of FIG. 13, control performed in steps S64 to S69 is performed in each of the different directions as illustrated in steps S34 to S38 and S39 to S43 of FIG. 10. In accordance with such control, in the case where the user's desired accuracies that are different in different directions need to be applied even at the intermediate point, fully closed control may be performed on fewer joints. The case where one intermediate point is present has been described in the description of FIG. 11 to FIG. 13. However, even in the case where two or more intermediate points are present at which the tip position of the robot arm 201 should be evaluated by the output-side encoders 236, processing illustrated in FIG. 12 and FIG. 13 may be performed.

Four exemplary embodiments have been described above; however, the present invention is not limited to the above-described exemplary embodiments. Various modifications are possible within the range of technical concepts of the present invention.

For example, in the case where fully closed control is selected in the above-described exemplary embodiments, for example, control is performed such that fully closed control is used from the starting point to the stopping position. However, there may be the case where the accuracy of the tip position of the robot arm does not matter on the way to a target position point when the tip position of the robot arm is moved to the target position point. In that case, semi-closed control is selected to control the joints on the way to the target position point. Then, the semi-closed control may be changed to fully closed control before the tip position of the robot arm reaches the target position point.

The above-described exemplary embodiments have described the case where the input-side encoders 235 and the output-side encoders 236 are rotary encoders; however, these encoders are not limited to rotary encoders. The input-side encoders 235 and the output-side encoders 236 may be any elements that are capable of detecting rotation angles of the shafts. For example, resolvers or the like may also be used.

In addition, the above-described exemplary embodiments have described the case where reduction gears that drive joints are strain wave gears; however, the reduction gears are not limited to strain wave gears. The present invention is applicable to reduction gears other than strain wave gears if an output shaft of such a reduction gear is displaced by elastic deformation, looseness, or the like when the output shaft is torqued.

In addition, the above-described exemplary embodiments have described the case where the robot arm is an articulated robot arm; however, the robot arm is not limited to this type of robot arm and the present invention may also be performed for Selective Compliance Assembly Robot Arms.

In addition, the above-described exemplary embodiments have described the case where the end effector is a robot hand; however, the end effector is not limited to such a robot hand and the present invention may also be performed for tools in which end effectors perform other tasks on work pieces.

In addition, the above-described exemplary embodiments have described the case where the driving force of rotary motors is directly transferred to the reduction gears; however, the system for transferring driving force is not limited to such a system and a unit that transfers driving force indirectly may be used. For example, rotation of a rotating shaft of a rotary motor may also be transferred to the input shaft of a reduction gear via a belt. In this case, the input-side encoder may detect either a rotation angle of a rotating shaft of a rotary motor or a rotation angle of the input shaft of a reduction gear.

In addition, the processing operations in the above-described exemplary embodiments are specifically performed by the CPU 301. Thus, the above-described functions may be realized by supplying a recording medium storing a program that realizes the above-described functions to the control device 300 and by reading and executing the program stored in the recording medium using a computer (a CPU or an MPU) of the control device 300. In this case, the program read from the recording medium realizes the functions of the above-described exemplary embodiments, and the program itself and the recording medium storing the program constitute the present invention.

In addition, the above-described exemplary embodiments have described the case where the HDD 304 is a computer readable recording medium and the program 320 is stored in the HDD 304; however, a medium that stores the program 320 is not limited to such an HDD. Such a program may also be recorded in any computer readable recording medium. For example, a recording medium for supplying such a program may be the ROM 302 or the recording disc 321 illustrated in FIG. 3, an external storage device, which is not illustrated, or the like. Specific examples of such a recording medium include a flexible disk, a hard disk, an optical disk, a magneto-optic disk, a CD-ROM, a CD-R, a magnetic tape, a rewritable nonvolatile memory (for example, a USB memory), a ROM, and the like. In addition, the program in the above-described exemplary embodiments may also be downloaded via a network and executed by a computer.

In addition, the case where the functions of the above-described exemplary embodiments are realized by executing program codes read by a computer is not the only case. The functions of the above-described exemplary embodiments may also be realized by an operating system (OS) or the like performing a portion or the entirety of actual processing in accordance with instructions of the program codes, the OS being running on the computer.

Furthermore, the program codes read from the recording medium may also be written into a memory included in a function extension board inserted into the computer or a memory included in a function extension unit connected to the computer. The functions of the above-described exemplary embodiments may also be realized by the CPU or the like included in the function extension board or the function extension unit and performing a portion or the entirety of actual processing in accordance with instructions of the program codes.

In addition, the above-described exemplary embodiments have described the case where the computer performs image processing by executing the program recorded in the recording medium, such as an HDD; however, this is not the only case. Some or all of the functions of the controller operating in accordance with the program may also be realized by a custom LSI, such as an ASIC, an FPGA, or the like. Note that the above-described ASIC is the acronym of Application Specific Integrated Circuit, and FPGA is the acronym of Field-Programmable Gate Array.

While the present invention has been described with reference to exemplary embodiments, it is to be understood that the invention is not limited to the disclosed exemplary embodiments.

This application claims the benefit of Japanese Patent Application No. 2014-141634, filed Jul. 9, 2014, which is hereby incorporated by reference herein in its entirety.

What is claimed is:

1. A control method for a robot apparatus, the robot apparatus including a robot arm having an end effector located at an end of the robot arm, the robot arm including a plurality of links coupled one to another by one or more joints, and a control device, the joint including a motor, an input-side encoder, and an output-side encoder, the control method comprising:
   driving, by the motor, the joint via a reduction gear;
   detecting, by the input-side encoder, an angle of an input drive shaft of the reduction gear;
   detecting, by the output-side encoder, an angle of an output drive shaft of the reduction gear; and
   selecting, by the control device, the semi-closed control or the fully closed control to control the joint, the semi-closed control being control in which an angle of an output drive shaft is controlled in accordance with an output of the input-side encoder, the fully closed control being control in which an angle of the output drive shaft is controlled in accordance with an output of the output-side encoder.

2. The control method for a robot apparatus according to claim 1, wherein the selecting includes
   performing a test run a plurality of times in which the control device causes the robot arm to operate while performing semi-closed control on the joint, and
   selecting either the semi-closed control or the fully closed control in accordance with a result, which is obtained by the control device evaluating the tip position of the robot arm at a specific point using outputs of the output-side encoder obtained in the test runs.

3. The control method for a robot apparatus according to claim 2, wherein in a case where semi-closed control is used to control the joint during operation, the control device calculates the bias of the tip position of the robot arm at specific points using the outputs of the output-side encoder obtained in the test runs and performs semi-closed control on the joint using a driving distance based on a correction value for correcting this bias.

4. The control method for a robot apparatus according to claim 2, wherein in the selecting step, the control device selects either semi-closed control or fully closed control for use to control the joint in accordance with the variation in the tip position of the robot arm at the specific point, the variation being calculated using the outputs of the output-side encoder obtained in the test runs.

5. The control method for a robot apparatus according to claim 2, wherein in the selecting step, the control device converts a variation in a joint angle of the joint, the variation being calculated using the outputs of the output-side encoder of the joint obtained in the test runs, into a variation in the tip position of the robot arm at a specific point, selects the semi-closed control for use to control the joint in a case where the variation satisfies a user's desired accuracy, and selects the fully closed control for use to control the joint in a case where the variation does not satisfy the user's desired accuracy.

6. The control method for a robot apparatus according to claim 2, wherein the specific point is a target position point to which the tip position of the robot arm is to be moved.

7. The control method for a robot apparatus according to claim 1, wherein the controlling includes
determining the content of a task that the robot arm is to be caused to perform,
selecting either the semi-closed control or the fully closed control for use to control the joint in accordance with the content of the task that is determined in the determining step and that the robot arm is to be caused to perform, and
performing a certain operation using the semi-closed control or the fully closed control on the joint, which is selected in the selecting step.

8. The control method for a robot apparatus according to claim 7, wherein in the selecting step, the control device selects either the semi-closed control or the fully closed control for use to control the joint in accordance with an object that the end effector is to be caused to operate.

9. The control method for a robot apparatus according to claim 8, wherein in the selecting step, the control device selects the fully closed control in a case where the object is an object applying random external forces to the robot arm.

10. The control method for a robot apparatus according to claim 8, wherein in the selecting step, in a case where, as the object, a plurality of objects are present that are identically shaped but made of different materials, the control device selects the fully closed control.

11. The control method for a robot apparatus according to claim 8, wherein in the selecting step, in a case where the object is an object whose center of gravity changes when the object is operated by the end effector, the control device selects the fully closed control.

12. The control method for a robot apparatus according to claim 7, wherein in the selecting step, the control device selects either the semi-closed control or the fully closed control for use to control the joint in accordance with an operation that the robot arm is to be caused to perform.

13. The control method for a robot apparatus according to claim 7, wherein in the selecting step, in a case where a target value of a joint angle of the joint is in a range of looseness or hysteresis of a system constituting the joint, the control device selects the fully closed control.

14. The control method for a robot apparatus according to claim 1,
wherein the control device is configured to select either the semi-closed control or the fully closed control of the joint in accordance with a content of a task that the robot arm is to perform, and to cause the robot arm to operate while performing the selected semi-closed control or fully closed control on the joint.

15. The control method for a robot apparatus according to claim 1, further comprising:
causing, by the control device, the robot arm to perform the selected semi-closed control or fully closed control on the joint.

16. A non-transitory computer readable recording medium storing a control program for a robot apparatus, the robot apparatus including a robot arm having an end effector located at an end of the robot arm, the robot arm including a plurality of links coupled one to another by one or more joints, and a control device, the joint including a motor, an input-side encoder, and an output-side encoder, the control program causing the robot apparatus to perform a control method comprising:
driving, by the motor, the joint via a reduction gear;
detecting, by the input-side encoder, an angle of an input drive shaft of the reduction gear, the semi-closed control being control in which an angle of the joint is controlled in accordance with an output of the input-side encoder;
detecting, by the output-side encoder, an angle of an output drive shaft of the reduction gear, the fully closed control being control in which an angle of the joint is controlled in accordance with an output of the output-side encoder; and
selecting, by the control device, the semi-closed control or the fully closed control to control the joint.

17. A robot apparatus comprising:
a robot arm having an end effector located at an end of the robot arm,
the robot arm including a plurality of links coupled one to another by one or more joints; and
a control device configured to selectively perform semi-closed control or fully closed control on the joint,
the joint including
a motor configured to drive the joint via a reduction gear,
an input-side encoder configured to detect an angle of an input drive shaft of the reduction gear, and
an output-side encoder configured to detect an angle of an output drive shaft of the reduction gear, the semi-closed control being control in which an angle of the joint is controlled in accordance with an output of the input-side encoder, the fully closed control being control in which an angle of the joint is controlled in accordance with an output of the output-side encoder,
wherein the control device is configured to select and use either semi-closed control or fully closed control to control the joint.

18. The robot apparatus according to claim 17, wherein the control device is configured to perform a test run a plurality of times in which the control device
causes the robot arm to operate while performing semi-closed control on the joint,
evaluates the tip position of the robot arm at a specific point using outputs of the output-side encoder obtained in the test runs,
selects either the semi-closed control or the fully closed control for use to control the joint in accordance with a result, and causes the robot arm to operate while performing the selected semi-closed control or fully closed control on the joint.

19. The robot apparatus according to claim 17,
wherein the control device is configured to select either the semi-closed control or the fully closed control of the joint in accordance with a content of a task that the robot arm is to perform, and to cause the robot arm to operate while performing the selected semi-closed control or fully closed control on the joint.

\* \* \* \* \*